(12) United States Patent
Heyring

(10) Patent No.: US 6,302,417 B1
(45) Date of Patent: *Oct. 16, 2001

(54) ROLL STABILIZATION MECHANISMS IN VEHICULAR SUSPENSION SYSTEMS

(75) Inventor: Christopher B. Heyring, Eagle Bay (AU)

(73) Assignee: Kinetic Limited, Dunsborough (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,082
(22) PCT Filed: Aug. 21, 1996
(86) PCT No.: PCT/AU96/00528
   § 371 Date: Apr. 20, 1998
   § 102(e) Date: Apr. 20, 1998
(87) PCT Pub. No.: WO97/06971
   PCT Pub. Date: Feb. 27, 1997

(30) Foreign Application Priority Data

Aug. 21, 1995 (AU) .................................................... PN4926
Jun. 7, 1996 (AU) .................................................... PO0333

(51) Int. Cl.[7] .......................... B60G 21/055; B60G 21/06
(52) U.S. Cl. .......................... 280/124.106; 280/124.152; 267/187; 267/191
(58) Field of Search .................. 280/124.106, 124.107, 280/127.137, 124.152, 124.162, 124.166; 267/187, 191, 190

(56) References Cited

U.S. PATENT DOCUMENTS 2,099,819  11/1937  Mercier .
3,025,078  3/1962  Allison .
3,147,990  9/1964  Wettstein .

(List continued on next page.)

FOREIGN PATENT DOCUMENTS

B49460/85  12/1986  (AU) .
606271  11/1934  (DE) .
654731  12/1937  (DE) .

(List continued on next page.)

OTHER PUBLICATIONS

Nobuaki, I., "Car Stabilizer Device," English–language abstract of Japanese patent 08011516 A (Jan. 16, 1996).
Masasugi, K., "Suspension System, "English–language abstract of Japanese patent 08002227 A (Jan. 9, 1996).

Primary Examiner—Peter C. English
(74) Attorney, Agent, or Firm—Birch, Stewart, Kolasch & Birch, LLP

(57) ABSTRACT

A vehicular suspension system for a vehicle includes at least one pair of transversely adjacent front surface engaging members and at least one pair of transversely adjacent back surface engaging members for supporting a body of the vehicle. The suspension system further includes a first force transmitting device interconnecting the at least one pair of transversely adjacent front surface engaging members, and a second force transmitting device interconnecting the at least one pair of transversely adjacent back surface engaging members. The force transmitting devices transfer forces between the interconnected surface engaging members. Each force transmitting device includes an adjustment device for progressively varying the magnitude and direction of the force transferred between the associated surface engaging members by the force transmitting devices as a function of the relative positions of and the load applied to at least two pairs of the interconnected surface engaging members. The adjustment devices are functionally linked such that the magnitude and the direction of the force transmitted between associated surface engaging members by each of the force transmitting devices is progressively varied to thereby maintain and return the attitude of the vehicle to a position that is at least substantially parallel to the average surface plane supporting the vehicle.

40 Claims, 13 Drawing Sheets

U.S. PATENT DOCUMENTS

| | | | |
|---|---|---|---|
| 3,197,233 | | 7/1965 | Van Winsen et al. . |
| 3,266,815 | | 8/1966 | Bishop . |
| 3,338,327 | | 8/1967 | Bishop . |
| 3,963,261 | * | 6/1976 | Hiruma .................. 280/124.106 |
| 4,014,561 | | 3/1977 | Tomiya et al. . |
| 4,844,506 | * | 7/1989 | Moriguchi et al. ........... 280/124.106 |
| 5,529,324 | * | 6/1996 | Krawczyk et al. ........... 280/124.106 |
| 5,735,540 | * | 4/1998 | Schiffler .................. 280/124.106 |

FOREIGN PATENT DOCUMENTS

| | | |
|---|---|---|
| 730961 | 1/1943 | (DE) . |
| 895106 | 9/1953 | (DE) . |
| 1043101 | 4/1959 | (DE) . |
| 1087465 | 2/1961 | (DE) . |
| 1091879 | 4/1961 | (DE) . |
| 1143722 | 8/1963 | (DE) . |
| 1780130 | 1/1972 | (DE) . |
| 0410675A1 | 1/1991 | (EP) . |
| 0410676A1 | 1/1991 | (EP) . |
| 792406 | 12/1935 | (FR) . |
| 865881 | 6/1941 | (FR) . |
| 980291 | 5/1951 | (FR) . |
| 997849 | 1/1952 | (FR) . |
| 1087745 | 2/1955 | (FR) . |
| 1153372 | 3/1958 | (FR) . |
| 2109185 | 5/1972 | (FR) . |
| 855257 | 11/1960 | (GB) . |
| 858569 | 1/1961 | (GB) . |
| 926830 | 5/1963 | (GB) . |
| 2189751A | 11/1987 | (GB) . |
| 93/01948 | 2/1993 | (WO) . |
| 95/11814 | 5/1995 | (WO) . |
| 95/23076 | 8/1995 | (WO) . |
| 95/25020 | 9/1995 | (WO) . |

* cited by examiner

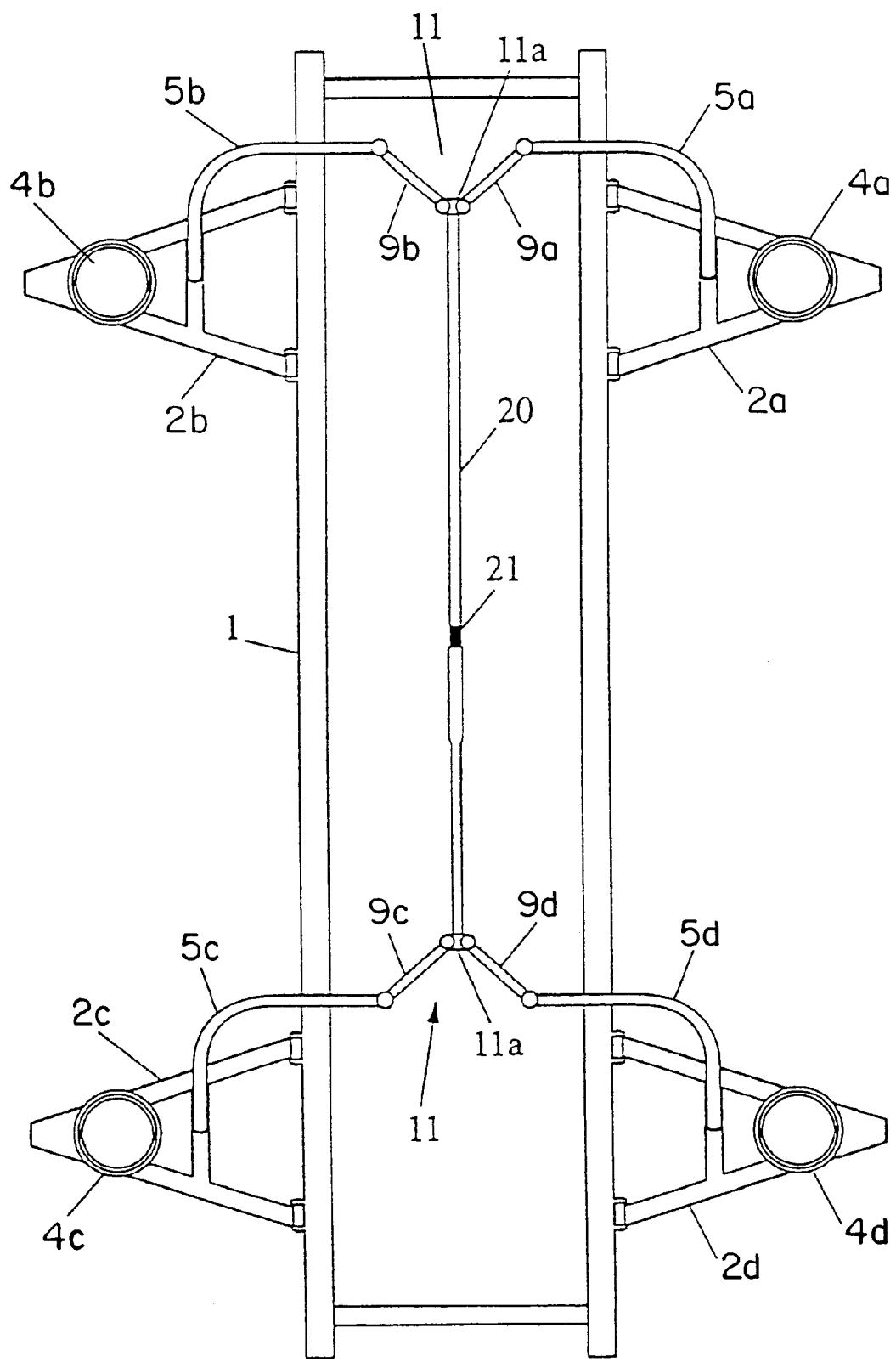

ROLL STABILIZATION MECHANISMS IN VEHICULAR SUSPENSION SYSTEMS

This application is the national phase under 35 U.S.C. §371 of prior PCT International Application No. PCT/AU96/00528 which has an International filing date of Aug. 21, 1996 which designated the United States of America, the entire contents of which are hereby incorporated by reference.

BACKGROUND OF THE INVENTION

1. Field of the Invention

The present invention is generally directed to vehicular suspension systems, and in particular to suspension systems incorporating roll stabilisation mechanisms.

2. Description of the Background Art

Modem vehicles are normally provided with one or more roll stabilisation or "torsion" bars which transversely link the wheels of one or more axles in order to afford some containment of roll motion to prevent uncomfortable and sometimes dangerous swaying motions when cornering. Roll stabiliser bars are typically manufactured as spring steel bars which permit torsional resilience so that as one wheel on an axle is caused to move in a generally upward or downward direction the other wheel on the same axle is induced to move in a similar direction at the same time. The extent to which the two wheels of a single axle move in a common direction is defined in part by the torsional rigidity of the roll stabiliser bar which transversely couples the two wheels in response to the lateral roll force exerted on the vehicle resulting from cornering.

Vehicles with high centres of gravity (such as trucks which are prone to excessive roll motions) and vehicles which are required to 'corner flat' without exhibiting excessive roll motions (such as sports cars) are normally provided with stiff roll stabiliser bars to prevent roll motion. An unbeneficial consequence of providing stiffer roll stabilisers is that the ride quality becomes harsher as both wheels of an axle become functionally linked (to an extent) and single wheel inputs are therefore not resolved by that single wheel alone which impacts on a bump or pot-hole.

Luxury passenger vehicles are, therefore, normally equipped with more compliant roll stabiliser bars so that single wheel inputs are absorbed by that single wheel's associated spring and damper unit which are relatively free to move in response to the single input without the additional resistance resulting from the stabiliser's torsional rigidity.

Regardless of the torsional rigidity of the torsion bar, the provision of such bars do restrict the degree of movement of the wheels relative to each other. This can be a disadvantage in situations where a large degree of opposing vertical wheel motion is required, for example, when travelling over undulating surfaces. The limitations of the wheel movement due to the roll stabiliser bars interconnecting the wheels can lead to significant side to side jerking of the vehicle under such conditions. This movement limitation also restricts the amount of traction that the wheels will have when travelling over such surfaces.

When travelling over uneven ground, the points where the wheels contact the ground are not all in a single plane. This results in the suspension of two diagonally opposed wheels becoming compressed, with the wheels moving closer to the vehicle body, and the suspension of the other two diagonally opposed wheels becoming extended. This mode of suspension operation is known as 'warp' or alternatively 'cross-axle articulation'.

It would be advantageous to have a vehicular suspension system which provides roll stability during cornering and also provides a comfortable ride when travelling in a near straight line or when traversing an undulating surface.

SUMMARY OF THE INVENTION

With this in mind, the present invention provides in one aspect a suspension system for a vehicle having at least one forward pair of surface engaging means and at least one rearward pair of surface engaging means connected to the body of the vehicle to allow substantially vertical relative motion of each surface engaging means with respect to the body, the suspension system including resilient support means for supporting the vehicle body with respect to the surface engaging means, a force transmitting means interconnecting at least one said forward pair of transversely adjacent surface engaging means and a force transmitting means interconnecting at least one said rearward pair of transversely adjacent surface engaging means, each force transmitting means including adjustment means, the adjustment means being longitudinally spaced and functionally linked such that the magnitude and the direction of the force transmitted between associated transversely adjacent surface engaging means by each of the force transmitting means varies progressively as a function of the relative positions of, and the load applied to, at least two pairs of the interconnected transversely adjacent surface engaging means, to thereby restrict roll motions of the vehicle whilst simultaneously facilitating warp motions of the surface engaging means.

Because of the functional linking of the adjustment means, this can provide "passive" control of the vehicle attitude. The suspension system can be self correcting without the need of any external control means. This avoids the need for components such as motion and displacement sensors, electronic control units for processing the sensor signals, and actuating components such as fluid pumps controlled by the electronic control units. Such arrangements are expensive and are relatively slow in their response to changes in surface conditions and vehicle motion.

The resilient support means may be provided between each said surface engaging means and the chassis of the vehicle. Alternatively, a said resilient support means may be provided for at least one said pair of transversely adjacent surface engaging means for carrying the load applied to both of the associated transversely adjacent surface engaging means. A said resilient support means may be provided for said at least one forward pair of transversely adjacent surface engaging means and a further said resilient support means may be provided for said at least one rearward pair of transversely adjacent surface engaging means for respectively providing substantially equal loading on each of the transversely associated surface engaging means.

The force transmitted by the force transmitting means may be a torsional force. To this end, means that allow torsional forces to be transmitted may be used. Therefore, each force transmitting means may include at least one transverse torsion bar. Preferably, each force transmitting means may include a pair of transverse torsion bars, each torsion bar being respectively connected to a said surface engaging means, the torsion bars being interconnected by the adjustment means. The torsion bars may be rotatable about their elongate axes, the adjustment means preferably progressively controlling the axial rotation of the associated torsion bars relative to each other such that the surface engaging means are permitted to move when undergoing warp motions while the roll attitude of the vehicle is simultaneously restrained by the torsion bars.

According to a preferred embodiment of the present invention, each adjustment means may provide a mechanical interconnection of the associated pair of torsion bars. The adjustment means interconnecting a said pair of transversely adjacent front surface engaging means and the adjustment means interconnecting a said pair of transversely adjacent back surface engaging means may be functionally linked by a mechanical connection. This mechanical connection may be a longitudinal shaft interconnecting said adjustment means, each adjustment means preferably including a pair of linkage members respectively connected at one end thereof to one of the torsion bars, the other end of each pair of linkage members being connected to an end of the longitudinal shaft such that torsional forces can be transmitted between said adjustment means.

According to another preferred embodiment of the present invention, the adjustment means may alternatively provide a hydraulic connection of the torsion bars. The adjustment means may be a double-acting ram, the ram having a cylinder and a piston assembly separating the cylinder into two fluid chambers therein. The cylinder may be connected to one of the torsion bars, and the piston assembly may be connected to the other torsion bar. A fluid communication may provided between the rams. To this end, the fluid communication may be provided by conduit means connecting the two fluid chambers of the double-acting ram of the front torsion bars with the fluid chambers of the double-acting ram of the back torsion bars whereby the transfer of fluid between the fluid chambers enables relative displacement between the piston assembly and the cylinder. The fluid chambers may be connected such that the surface engaging means are permitted to move when undergoing warp motions with the movement of the piston assembly within each cylinder allowing the transfer of fluid between the connected fluid chambers with minimal change in the pressure differential across the piston assembly, while roll motions of the vehicle are reacted by an increase in the pressure differential across the piston assemblies generated by the increase in load on the surface engaging means on one side of the vehicle and the similar reduction in the load on the surface engaging means on the other side of the vehicle to thereby control the roll attitude of the vehicle whilst simultaneously minimising the changes in load on each surface engaging means due to warp motions. Furthermore, fluid supply means for supplying fluid to the conduit means may also be provided, so that fluid can be added to one conduit and fluid can be at least substantially simultaneously removed from the other conduit to thereby enable the roll angle of the vehicle to be controlled. This enables a degree of active control of the vehicle attitude if so required, or a relatively slow control to be provided for a simple average levelling function. Roll resilience means such as a hydropneumatic accumulator may also be provided in fluid communication with both of the conduit means. The roll resilience means may include damping means for damping the rate of roll and isolating means for isolating the roll resilience means to thereby improve the roll control. It should however be noted that such a fluid supply means or roll resilience means is not essential to the operation of the vehicular suspension system of the present invention. The fluid supply means may optionally also be used to control the roll resilience by changing the pressure and volume of fluid in the conduit means and the roll resilience means.

According to a further preferred embodiment of the present invention, the adjustment means may be a rotary actuation means including a housing supporting a rotor separating the housing into at least two fluid chambers, the housing being connected to one of the torsion bars, the rotor being connected to the other torsion bar. Conduit means may provide fluid communication between the two fluid chambers of the rotary actuation means of the front torsion bars with the fluid chambers of the rotary actuation means of the back torsion bars. The fluid chambers may be connected such that the surface engaging means are permitted to move when undergoing warp motions with the movement of the rotor within each housing allowing the transfer of fluid between the connected fluid chambers with minimal change in the pressure differential across the rotor, while roll motions of the vehicle are reacted by an increase in the pressure differential across the rotor generated by the increase in load on the surface engaging means on one side of the vehicle and the similar reduction in the load on the surface engaging means on the other side of the vehicle to thereby control the roll attitude of the vehicle whilst simultaneously minimising the changes in load on each surface engaging means due to warp motions.

In the preferred arrangement where a said resilient support means is provided for at least one said pair of transversely adjacent surface engaging means for carrying the load of both associated transversely adjacent surface engaging means, the resilient support means may be provided for said at least one forward pair of transversely adjacent surface engaging means and for said at least one rearward pair of transversely adjacent surface engaging means for respectively providing substantially equal loading on each of the transversely associated surface engaging means. For example a yoke means interconnecting each pair of torsion bars may be provided, wherein said resilient support means connects the yoke means to the chassis of the vehicle, the yoke means transferring the average load carried by the associated surface engaging means to the resilient support means such that the resilient support means at least substantially supports at least a portion of the vehicle to thereby permit the vehicle to maintain an at least substantially uniform load on each surface engaging means regardless of the warp position of the surface engaging means. The yoke means may be provided by a lever arm respectively extending from each torsion bar, the lever arms being interconnected by a cross member arrangement. The resilient support means can interconnect the cross member arrangement with the chassis of the vehicle, the resilient support means preferably including a load support ram having an accumulator in fluid communication with the ram to provide said resilient support.

According to another preferred embodiment of the invention, the resilient support means may be provided between the surface engaging means and the chassis of the vehicle for at least substantially supporting the weight of the vehicle-and additionally, yoke means may interconnect each pair of torsion bars. Double-acting rams may interconnect the yoke means with the chassis of the vehicle, and conduit means may connect corresponding chambers of the rams and valve means may be provided in said conduit means for controlling the fluid flow through each conduit means to thereby control the pitch motion of the vehicle. Accumulators in fluid communication with at least one of the conduits may also be provided. Fluid supply means for supplying and removing fluid from said conduit means, sensing means for sensing the attitude of the vehicle, and control means for controlling said fluid supply means may also be provided to thereby allow control of the attitude of the vehicle.

According to yet another preferred embodiment of the present invention, the force transmitting means may include a single transverse torsion bar and the adjustment means may interconnect the torsion bar to at least one of the associated surface engaging means. The adjustment means may provide a hydraulic connection of the torsion bar to the associated surface engaging means. Each said adjustment means may include a double-acting ram located at one end of the torsion bar, the ram having a cylinder and a piston assembly separating the cylinder into two fluid chambers therein, the cylinder and the piston assembly being connected between one end of the torsion bar and the adjacent surface engaging means. The rams may be in fluid communication and the fluid communication may be provided by conduit means respectively connecting the two fluid chambers of the double-acting ram of the front torsion bar with the fluid chambers of the double-acting ram of the back torsion bar. The fluid chambers may be connected such that the surface engaging means are permitted to move when undergoing warp motions with the movement of the piston assembly within each cylinder allowing the transfer of fluid between the connected fluid chambers with minimal change in the pressure differential across the piston assembly, while roll motions of the vehicle are reacted by an increase in the pressure differential across the piston assemblies generated by the increase in load on the surface engaging means on one side of the vehicle and the similar reduction in the load on the surface engaging means on the other side of the vehicle to thereby control the roll attitude of the vehicle whilst substantially minimising the changes in load on each surface engaging means due to warp motions.

The adjustment means may alternatively be a single-acting ram located at each end of the torsion bars, each ram having a cylinder and a piston assembly supported therein to provide a fluid chamber within the cylinder, the cylinder and piston assembly being connected to one of the torsion bars and the adjacent surface engaging means. A fluid communication may be provided between the rams wherein said fluid communication is provided by conduit means respectively connecting the fluid chamber of each single-acting ram of the front torsion bar with the fluid chamber of the longitudinally opposing single acting ram of the back torsion bar, the fluid chambers being connected such that the surface engaging means are permitted to move when undergoing warp motions, while roll motions of the vehicle are reacted to by the torsion bars whilst simultaneously minimising the changes in load on each surface engaging means due to warp motions. Optionally, fluid supply means for supplying fluid to the conduit means may also be provided, so that fluid can be added to one conduit and fluid can be at least substantially simultaneously removed from the other conduit to thereby enable the roll angle of the vehicle to be controlled. This enables a degree of active control of the vehicle attitude if so required, or a relatively slow control to be provided for a simple average levelling function. Roll resilience means such as a hydropneumatic accumulator may also be provided in fluid communication with both of the conduit means, said roll resilience means including damping means for damping the rate of roll and isolating means for isolating the roll resilience means to thereby improve the roll control. It should however be noted that such a fluid supply means or roll resilience means is not essential to the operation of the vehicular suspension system of the present invention. The fluid supply means may optionally also be used to control the roll resilience by changing the pressure and volume of fluid in the conduit means and the roll resilience means.

Alternatively, the adjustment means may provide a mechanical coupling of the torsion bar.

According to another aspect of the present invention, there is provided a suspension system for a vehicle having at least one forward pair of surface engaging means and at least one rearward pair of surface engaging means connected to the body of the vehicle to allow substantially vertical relative motion of each surface engaging means with respect to the body;

the suspension system including resilient support means for supporting the vehicle body with respect to the surface engaging means, said resilient support means being provided for said at least one forward pair of transversely adjacent surface engaging means and for said at least one rearward pair of transversely adjacent surface engaging means for respectively providing substantially equal loading on each of the transversely associated surface engaging means;

a force transmitting means interconnecting at least one said forward pair of transversely adjacent surface engaging means and a force transmitting means interconnecting at least one said rearward pair of transversely adjacent surface engaging means;

each force transmitting means including adjustment means, the adjustment means being longitudinally spaced and functionally linked such that the magnitude and the direction of the force transmitted between associated transversely adjacent surface engaging means by each of the force transmitting means varies progressively as a function of the relative positions of, and the load applied to, at least two pairs of the interconnected transversely adjacent surface engaging means, to thereby restrict roll motions of the vehicle whilst simultaneously facilitating warp motions of the surface engaging means such that there is negligible change in the load on each said surface engaging means in relatively low speed warp motions.

According to a further aspect of the invention there may be provided a vehicle including a suspension system as described above.

BRIEF DESCRIPTION OF THE DRAWINGS

It will be convenient to further describe the invention by reference to the accompanying drawings which illustrate possible embodiments of the invention. Other embodiments of the invention are possible and consequently the particularity of the accompanying drawings is not to be understood as superseding the generality of the preceding description of the invention.

FIG. 2b. is a detail view of the suspension system of FIG. 2a;

FIG. 3 is a plan view as seen from the underside of the vehicle chassis showing the general layout of a fourth embodiment of a suspension system according to the present invention;

DETAILED DESCRIPTION OF THE PREFERRED EMBODIMENT

Figure 1A:
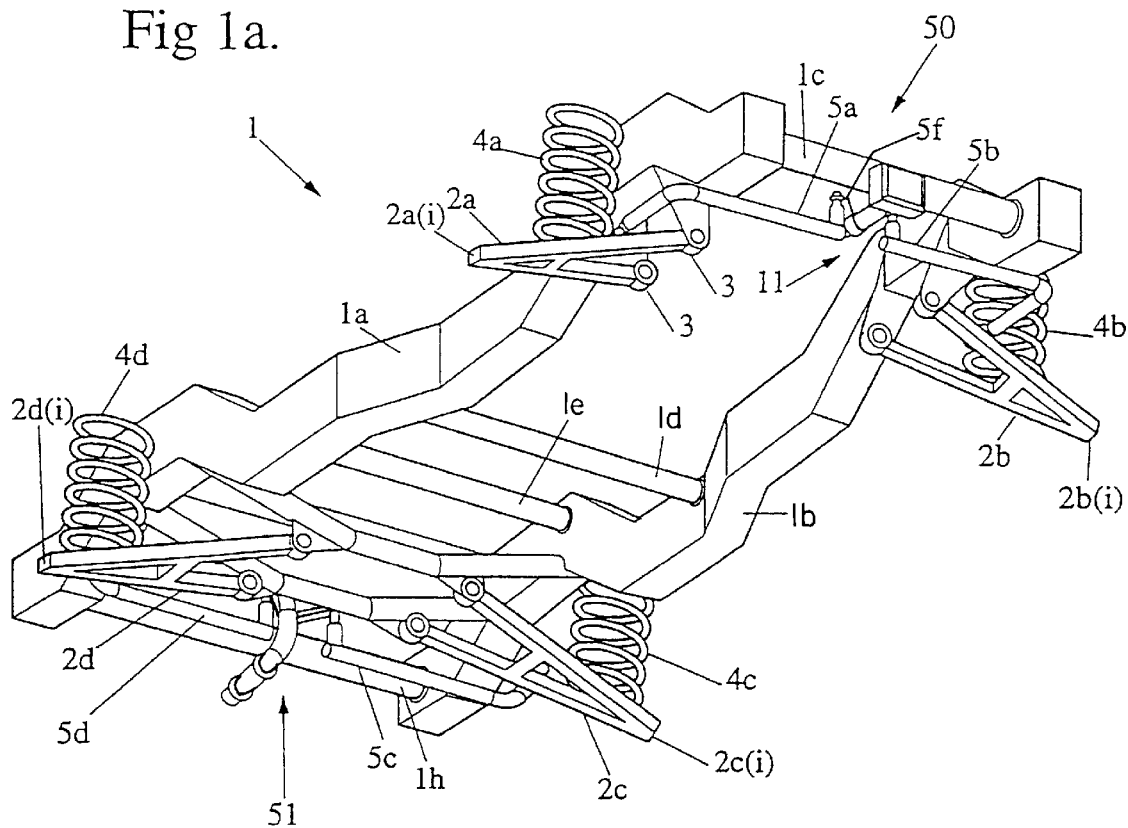
FIG. 1a. is an isometric view of the underside of a vehicle chassis showing a first embodiment of the suspension system according to the present invention.

All the accompanying drawings and figures are similarly marked so that all identical components in all the drawings carry the same numbers and symbols for simplicity and only those parts that are relevant to the present invention are shown.

Referring initially to FIG. 1, there is shown typical features of a vehicle chassis and a first embodiment according to the present invention. The front of the vehicle chassis 1 is shown facing the top right hand corner of the sheet. The chassis 1 includes two main longitudinal rails 1a, 1b and chassis cross members 1c, 1d, 1e, 1h interconnecting the rails 1a, 1b.

Lower wishbones 2a, 2b, 2c, 2d locate wheels (not shown) permitting them to move in a substantially vertical direction. The wishbones are in the shape of an "A" and are pivotally attached to the chassis 1 at the base 3 of each wishbone. The upper wishbone or "McPherson attachment" is omitted from the drawing for clarity reasons. Wishbone 2a therefore provides a movable location means for the front right wheel while wishbone 2c attaches the rear left wheel assembly to the chassis 1. Each wheel assembly is respectively attached to the outer ends 2a(i), 2b(i), 2c(i), 2d(i) of the wishbones.

It should be understood that other known linkage means may alternatively be used to locate the wheels relative to the chassis 1 such that they may move in a generally vertical direction. For example, the present invention is also applicable for vehicles fitted with multi-link wheel geometry such as trailing and leading arms, Panhard rods and even leaf springs.

In FIG. 1a, coil springs 4a, 4b, 4c, 4d are mounted on the upper surfaces of wishbones 2a, 2b, 2c, 2d respectively. It is to be understood that the upper ends of the coil springs are resolved against an attachment joined to the chassis 1 (although this is not represented) so that as the wishbones move up and down in a generally vertical direction about pivot points 3, the springs are compressed and allowed to extend between the wishbone and the chassis attachment as in known suspension systems. The coil springs support most of the weight of the vehicle.

The suspension system shown in FIG. 1a is provided with torsion means 50, 51, interconnecting each pair of transversely adjacent wishbones 2a,2b and 2c,2d. Each torsion means includes two components 5.a,5b and 5c,5d which are similar to known transverse roll stabiliser bars. These are attached to the wishbones by known means such as ball joints, bushes or drop links so that as the wheel assemblies move in a generally vertical direction the main shaft of each component is urged to turn inside housings (not shown) which are attached to the chassis 1 as in known roll stabiliser bars. Roll stabiliser bars are normally manufactured from spring steel which provides some torsional resilience along its length.

The above described features of the suspension system do not significantly depart in design and function from known suspensions incorporating roll stabiliser bars. However, because the torsion means are each divided into two components 5a, 5b, and 5c, 5d, the 'roll stabiliser' functions of these components may be reversed. Accordingly it is more appropriate to refer to these components henceforth as 'transverse torsion bars' as at times they fulfil a function which is entirely contradictory to roll stabilisation. A pair of these transverse torsion bars are provided at each end of the chassis 1, and each pair of torsion bars are interconnected by means of a central adjustment means 11.

The adjustment means 11 provided in between the two transverse torsion bars at each end thereof, control the function of the transverse torsion bars such that at some times the two halves may be coupled as though the two halves were functionally one, and at other times the two halves are caused to contra-rotate about their elongate axes relative to each other. Therefore the functions of the transverse torsion bars can be reversible to either effectively increase roll motions on each axle independently or to prevent such divergent movements of both wheels on one axle simultaneously. Furthermore, according to the present invention, the adjustment means 11 for each pair of transverse torsion bars can be controlled simultaneously as a function of the vehicle motion and attitude. This will be made clear from the following description.

Figure 1B:
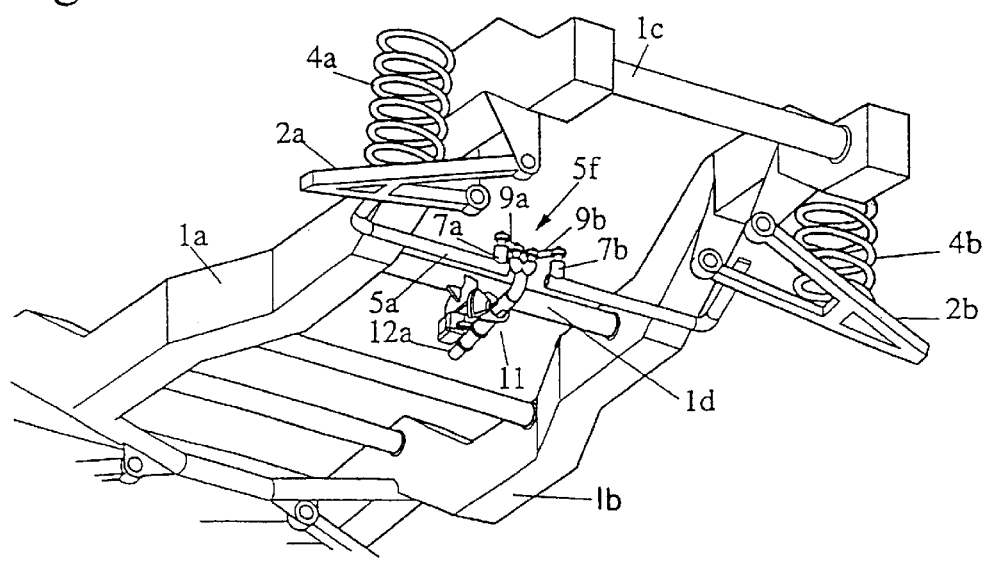
FIG. 1b. is an isometric view of a second embodiment of the suspension system according to the present invention.
Figure 1C:
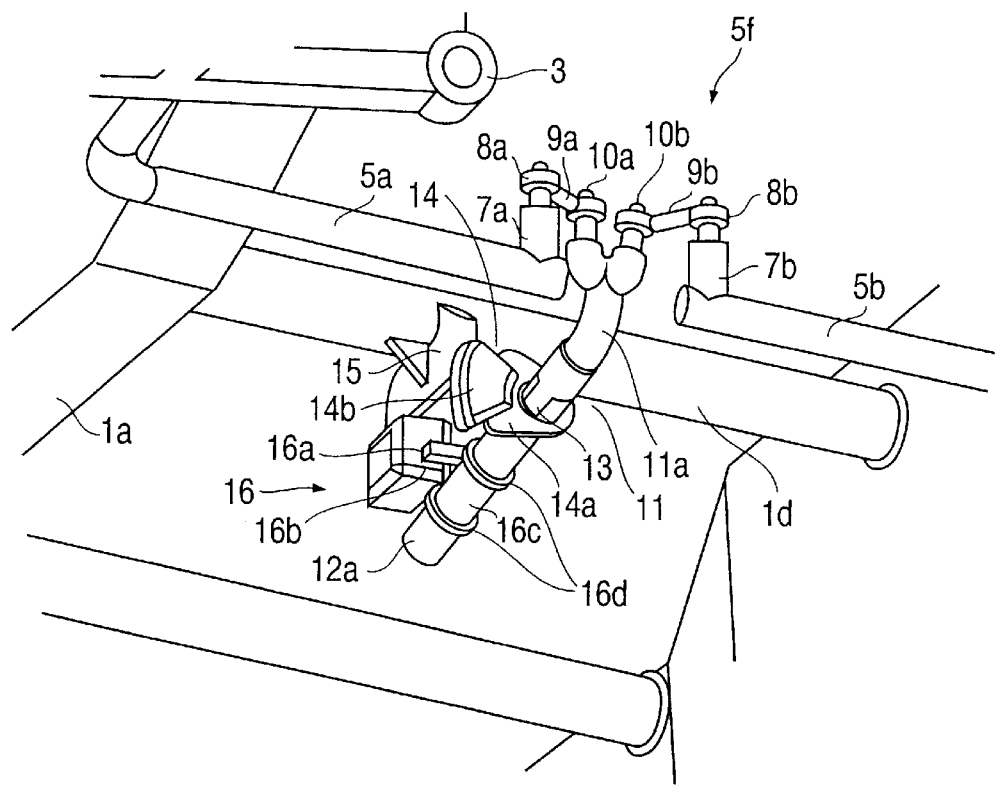
FIG. 1c. is a detail view of the suspension system of FIG. 1b.

Alternative forms of adjustment means 11 are possible and various such means are illustrated. In FIGS. 1a, 1b, and 1c, for example, the components in the adjustment means 11 may be described as follows: The transverse torsion bars are rotatably fixed to the chassis and axle by any known means such as sleeves, and these details are omitted in most Figures. Lever ends are provided at the ends of the transverse torsion bars to enable torsional forces to be imparted to the transverse torsion bars. The lever ends may be fabricated in any known manner such as those commonly provided in torsion bar linkages. FIG. 1a shows the adjustment means 11 connecting the front transverse torsion bars in a schematic fashion. An embodiment of the adjustment means 11 is shown in more detail in FIGS. 1b and 1c. It should be noted that while only the adjustment means 11 of the front transverse torsion bars is shown, a corresponding adjustment means arrangement can also be provided for the back transverse torsion bars. Referring now to FIGS. 1b and 1c, at the opposite ends of the transverse torsion bars lever ends are provided lever arms 7a, 7b, attached to transverse torsion bars 5a, 5b respectively. The outer ends of the lever arms describe arcs in a plane generally parallel to the general longitudinal plane within which the wheels rotate. The pair of transverse torsion bars 5a, 5b is interconnected by a linkage assembly 5f. The ends of the levers arms 7a, 7b are provided with 'eye bolts' or ball joints or tie rod ends or bushings 8a, 8b which permit linkages or couplings to be flexibly joined.

The flexible joints attach each lever arm to a respective short linkage 9a, 9b. The opposite end of each linkage 9a, 9b is also provided with single or double flexible joints 10a, 10b which may be similar in construction to joints 8a, 8b.

Attached to these paired flexible joints at each end of the vehicle there is shown another lever mechanism 11a. This lever mechanism is attached by known means to a rotatable longitudinal stub shaft 12a which has a main rotational axis that is generally perpendicular to the axis of the transverse torsion bars 5a, 5b and which therefore generally follows the longitudinal axis of the vehicle.

Accordingly with reference to FIGS. 1b and 1c, if the right front wheel at supported by wishbone 2a moves in a downward direction then the transverse torsion bar 5a. (in FIGS. 1b and 1c) is caused to rotate about its elongate axis as a result. The associated lever arm 7a will therefore describe an arc towards the front of the vehicle, and this motion will pull on the linkage 9a. which in turn will pull the perpendicular lever 11a through an arc, transversely towards the front right wheel about its pivotal axis on stub shaft 12a.

The linkage 9b will in addition pull on pivot point 8b at the top of lever 7b. which will describe an arc towards the rear of the vehicle about the axis defined by the other half transverse torsion bar 5b thereby transmitting a torsional force into an upward direction onto the front left wheel assembly supported at wishbone 2b. Therefore, the vertical movement of one wheel can induce the opposite vertical movement of the other wheel on the same axle.

It should be understood that in order for one transverse torsion bar such as 5a to cause the other transverse torsion bar 5b to contra-rotate, the transverse torsion bars 5a, 5b and the longitudinal stub shaft 12a must be free to rotate about their own elongate axis although they should be restrained from moving axially, that is transversely in the case of torsion bars 5a, 5b and in the longitudinal plane of the vehicle in the case of stub shaft 12a. If the longitudinal stub shaft and transverse torsion bars are permitted to move axially this will result in the ultimate promotion of wheel movements in the same vertical direction simultaneously on both sides of the vehicle.

In order, therefore, to increase traction by forcing each wheel to maintain substantially consistent ground pressure at each tyre, (when travelling in an approximately straight line), it is necessary to cause the relative contra rotation of the two transverse torsion bars of each axle by permitting the longitudinal stub shaft 12a to rotate about its elongate axis whilst restraining it from moving axially.

Conversely, to improve roll stability (when this is desirable such as when cornering), it is necessary for both wheels on the same axle to attempt to move in the same vertical direction simultaneously and in this instance it is necessary to restrain the rotational movement of the longitudinal stub shaft 12a about its elongate axis whilst permitting this stub shaft to move in the axial direction instead. The transverse torsion bars still have to move rotationally but do not need to move axially in this instance.

Therefore, the wheels are permitted to move when undergoing warp motions while roll motion of the vehicle are reacted to by the transverse torsion bars. According to the present invention, the transverse torsion bars at both ends of the vehicle can also be simultaneously controlled in this manner under vehicle roll conditions.

However, under conditions where opposing vertical wheel movement is required, relative counter rotation between each pair of torsion bars is facilitated. Simultaneous control of the front and back transverse torsion bars is essential where substantial warp motions are required. In such situations, one pair of diagonally opposed wheels are required to move in the same general direction while the other pair of diagonally opposed wheels are required to move in the opposite direction or be held generally stationary relative to the former pair of wheels.

The linkage means 5f comprising the levers and links between the two transverse torsion bars 5a, 5b can therefore be controlled such that the suspension system can both resist roll motion or encourage opposite individual wheel movements, in particular, in the warp mode. Any differing mix of roll and load sharing can therefore be applied by restricting the movement of the longitudinal shaft 12a by either restraining the shaft axially, or rotationally, individually, collectively or not at all.

It should be noted that it is mechanically feasible, if not sometimes preferable, to terminate the transverse torsion bars in ways other than the described links, in order to provide a more positive and durable linkage and control mechanism which may work in similar ways or which may permit additional benefits. For example, the transverse torsion bars 5a, 5b, 5c, 5d, may optionally terminate in "T" junctions at their inboard ends instead of the "L" shaped levers as illustrated. The longitudinal shaft 12a may also be provided with matching double levers. In providing "T" shaped double levers either side of the shafts, these bars are caused to rotate on their axes without significant eccentric side loads. The cleats and attachment means which locate the shafts relative to the chassis may be minimised by the double lever terminations. Additionally, roll control and wheel movement enhancement modes may also be selected in a different manner by functionally causing the double ended "T" junction on the end of the longitudinal shaft to be decoupled to function as required like the previously described "L" lever system as shown in FIG. 1and the different types of lever means may therefore be used as different kinds of control mechanisms.

There are various methods which can be used to select when and how to cause the central adjustment means 11 to enhance roll control or encourage vertical wheel travel motions. Now with reference to FIG. 1c, it will be seen that shaft 12a has a grooved or splined portion 13 to slidably locate a brake unit 14 which for the purpose of demonstrating this part of the invention is drawn schematically as a segment of disc brake 14a and a brake calliper mechanism 14b.

The segment of disc brake 14a is provided with a splined inner surface which locates on the outer matching splined surface of shaft 12a. Brake segment 14a is caused to rotate in a limited arc along with the longitudinal shaft 12a. When the whole of shaft 12a. moves axially, however, the segment of disc brake 14a remains in its usual axial location relative to the chassis as it is located within the brake calliper mechanism 14b which is permanently fixed onto the vehicle body or chassis cross member by any convenient means such as by a cleat 15.

In order to promote roll resistance therefore, the brake calliper mechanism 14b contracts/presses onto, and restrains, brake segment 14a so that it cannot permit shaft 12a to turn, whilst still allowing this shaft to move axially thereby only permitting the torsion bar levers 7a,7b to move in unison in the same longitudinal plane, thereby causing both wheels to become predisposed towards moving in the same vertical direction at the same time, also in order to limit roll motion.

A second brake mechanism 16 is also located in such a way so as to prevent the axial movement of shaft 12a, whilst allowing the shaft to rotate about its own axis. The purpose of this then is to restrain the lever mechanism 11a extending from the longitudinal shaft 12a from moving freely in the longitudinal direction which encourages roll control whilst encouraging it to rotate about the axis of shaft 12a to promote the contra rotation of the two transverse torsion bars and to thereby promote the opposite vertical movements of the associated wheels.

The longitudinal brake mechanism 16 basically comprises a brake plate 16a, which moves in a longitudinal direction through the brake calliper mechanism 16b. The plate section is located on the shaft 12a by means of a tube 16c which is free to rotate about shaft 12a but which is located in between two stops or rings 16d which are permanently fixed to the shaft. All extraneous details such a the brake hoses and pads are omitted from the drawings.

It should be understood that the same functions may be achieved by other known and equivalent means including drum brakes, brake bands on the outer surface of a cylinder or simple pin and eye type locking mechanisms which locate the relative parts in one fixed position or help to centre the relative components to a preferred central position.

An additional example of location means which has additional advantages may be described in terms of a passive or a semi active system, in which the shaft's positions and movements are determined by two hydraulic cylinders mechanically connected between the vehicle chassis and longitudinal shaft in place of the brake mechanisms and hydraulically connected to a pressure source such as a pump or accumulator. The control system need not necessarily, therefore, rely on merely damping out forces by way of creating frictional losses as in a passive system, but rather by way of forcing positive roll correction and vertical wheel travel motions by actively rotating and moving the shafts appropriately (as described above) but in this instance via the hydraulic actuators.

In any event, whether the roll and wheel motions are passively or actively effected, the system (as described with reference to the FIGS. 1a to 1c) requires that roll forces and wheel travel motions are sensed or monitored so that the appropriate brake or actuator means is caused to work at the correct time. Under normal situations the wheel positions relative to the body are measured using any suitable known devices such as potentiometers attached between each wheel assembly and the body. Accelerometers, steering/throttle/brake pedal position sensors, G switches, and mercury switches are also now common and widely used in the automotive industry to detect cornering forces. The information from the wheel potentiometers and accelerometers may be collated along with information from the speedometer, (and any other input considered useful), to determine when each regulation or control means such as the brake units 14, 16 should be made to operate at any given time to provide the best mix of assisted wheel travel motion and roll control. An electronic control means (ECU) can typically be provided to receive the various sensor signals and to provide control signals to the adjustment means.

Figure 2A:
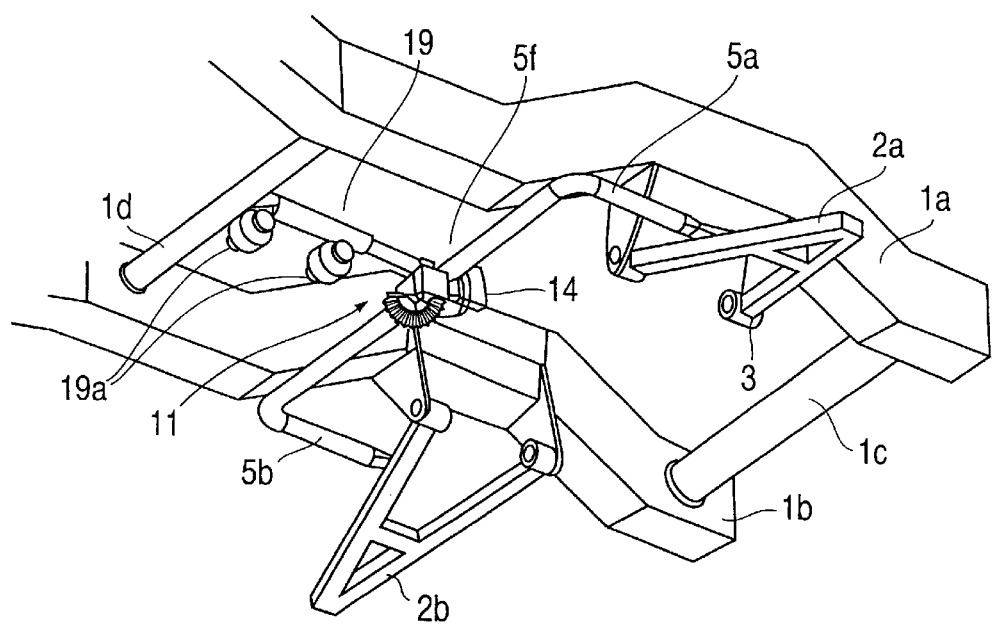
FIG. 2a. is a third embodiment of the suspension system according to the present invention.
Figure 2B:
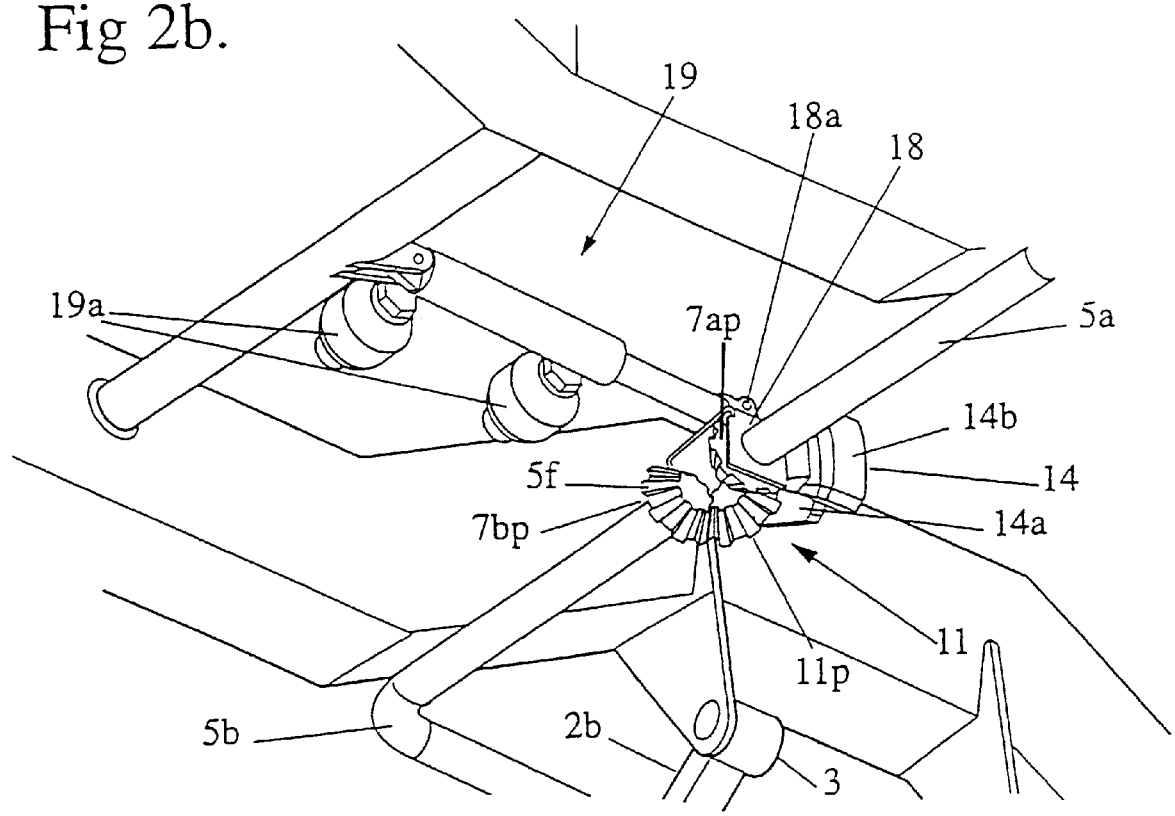

FIGS. 2a and 2b show an alternative central adjustment means 11 which is mechanically equivalent to the lever and link mechanisms as illustrated in FIGS. 1a, 1b, 1c. FIGS. 2a, 2b are also isometric views of the underside of part of the vehicle chassis as if looking up from the right hand side of the vehicle towards the front left hand wheel. Accordingly the transverse torsion bar 5b is located towards the lower left side of the sheet and the other transverse torsion bar 5a slopes upwards towards the top right of the sheet.

The levers and links shown in FIGS. 1a to 1c are replaced in FIGS. 2a and 2b by three meshed bevel gears 7bp, 7ap. and 11p. The lever 7a on the inner end of transverse bar 5a is therefore replaced by bevel 7ap while lever 7b is replaced by bevel 7bp joined onto the end of shaft 5b. Lever 11a is similarly replaced by bevel 11p. The two bevel gears 7ap and 7bp are caused to contra-rotate as they are both meshed with the common bevel gear 11p which has a rotational axis that is perpendicular to the axis of rotation of the two transverse torsion bars.

Although complete bevel gears are illustrated for clarity it is equally possible to install segments of bevel gears instead, as the axles in vehicles usually do not turn through arcs of greater than twelve degrees and consequently the bevel gears themselves do not need to rotate through greater angles. In order to provide a very positive meshing of the bevel gears they may be designed with helical gear teeth as in other known applications. Additionally extra bevel gears may be designed into the linkage unit 5f to provide a more positive meshing of the shaft and to resolve the loads with fewer eccentricities.

In FIGS. 2a and 2b, it will be seen that the coil springs (numbered 4l, 4b in FIG. 1) have been optionally omitted and the main support for the vehicle is therefore provided by transverse torsion bars which are resolved into the chassis at cross member 1d by way of a resilient means in the following manner. The transverse torsion bars 5a, 5b are meshed in the linkage assembly 5f (which in this drawing is represented as three bevel gears 7bp, 7ap, and 11p). These three bevel gears are located in a housing numbered 18. The bevel housing 18 is provided with any suitable cleat 18a which provides an anchorage point for a resilient means located between the cleat 18a and the chassis cross-member 1d.

A hydropneumatic strut 19 is shown in FIG. 2b to represent the resilient means in combination with one or more gas springs or accumulators numbered 19a. Damping valves in the mouths of the accumulators 19a. (similar to those of known Construction and not visible in this drawing) may be provided as a shock absorber for this central resilient means. The advantage of this central damping mechanism is that it provides damping for pitch direction inputs alone and can therefore be matched to this specific frequency requirement, without adversely effecting the roll damping at a different frequency. Roll damping may be provided at the wheels by way standard shock absorbers for example.

If the coil springs at the wheels are omitted, then the central resilient means 19 must provide the ultimate support for that end of the vehicle, and without this unit the entire assembly comprising of the twin transverse torsion bars 5a, 5b and central adjustment means 71 would rotate and would thereby permit the vehicle to drop onto the rubber jounce bumpers.

Any suitable combination of resilient means may be provided whereby outer coil springs could be relatively unsupportive in combination with a strong central resilient means such as the hydropneumatic strut 19, or conversely, the central hydropneumatic strut may provide little support while outer coil springs at the wheels may carry the majority of the vehicle's weight. Alternatively again, each central resilient means can carry the entire portion of the body weight that is born by the associated wheels.

The resilient and damper means such as the hydropneumatic strut 19 therefore provides an additional level of resilience in the pitch plane to significantly improve comfort in the longitudinal pitch direction whilst still maintaining firm roll resilience to maintain a high standard of handling so that the vehicle handles like a sports car in roll but is as comfortable as a limousine in pitch;

While a hydropneumatic strut 19. is represented in FIG. 2a, 2b it is equally convenient at times to replace this unit with any other type of known resilient means such as a rubber block, or coil spring, which may preferably also accommodate a damper (shock absorber).

One of the advantages of providing a hydropneumatic strut over say, a coil spring, is that the hydropneumatic strut may optionally be connected to a fluid pressure source (fluid pump) and reservoir (tank) so that additional hydraulic fluid may be introduced into the strut and accumulator to raise the vehicle up, or the fluid may be drained back to the tank to allow the vehicle to reduce its height. Such attitude and height adjustment is desirable to level the vehicle when weight is eccentrically applied onto one end of the machine or the vehicle may benefit from being lowered at both ends when being driven at high speed, for example. It should however be noted that it is possible to eliminate the resilient means between the torsion bars and the vehicle chassis, the transverse torsion bars being for example supported against the vehicle chassis by a solid bar. The resilience would then be provided solely by the resilience of the torsion bars.

Roll motion and individual dynamic wheel movements of low amplitude at high speed requiring a limited amount of wheel travel are thus resolved by relatively stiff transverse torsion bars (springs) and shock absorbers (dampers) which are omitted from drawings. A brake mechanism 14 prevents the central bevel gear turning freely and this prevents the contra rotation of the associated transverse torsion bars to promote roll minimisation as required. Components 14a and 14b, in FIG. 2b are similarly referenced to those referred to in the similar functional context with reference to the embodiment illustrated in FIGS. 1a to 1c.

When traversing uneven terrain the resilient mechanism 19 (FIGS. 2a and b) provides support for the contra rotational linkage 5f (bevel gear set) so that contra rotation of the two transverse torsion bars can be achieved more easily. This suspension system therefore exhibits multiple spring rates which differ in response appropriately as when the vehicle requires a stiff roll resistance response or when a softer pitch response for comfort when driving in a more straight line.

The above embodiment has an advantage in that it allows for at least substantially equal loadings to be applied to each wheel. In conventional suspension systems where a coil spring or other resilient means is provided at each wishbone, it is necessary for the suspension system to overcome the spring force of the resilient means before motion of the wheel can be effected. However, when the wishbones are free of any resilient means, this allows for free movement of the wishbone thereby allowing at least substantially equal loadings to be applied to each wheel by the suspension system.

Further developments of the present invention will now be described which enable the suspension system itself to intrinsically differentiate between circumstances when roll resistance should be enhanced or actively reversed, without the requirement for external sensors and an ECU or intelligence system. Moreover, the suspension system variations described below automatically and passively react to the various requirements of the system, to provide the required response without any outside influence, or intelligence, or requirement for energy.

FIG. 3 shows a further embodiment of a suspension system according to the present invention. This embodiment is similar to the embodiment shown in FIGS. 1a to 1c in that the vehicle chassis 1 is supported on wishbones 2a, 2b, 2c, 2d, and coil springs 4a, 4b, 4c, 4d are also provided as in conventional suspension systems. Furthermore, the wishbones at each end of the vehicle chassis 1 are respectively interconnected by respective pairs of transverse torsion bars 5a, 5b, 5c, 5d. Each pair of torsion bars are also connected by adjustment means 11 in the form of linkage means 9a, 9b, 9c, 9d, 11a as in the earlier embodiments. The principal difference is that a longitudinal shaft 20 interconnects the adjustment means 11 of each pair of torsion bars.

The longitudinal shaft 20 is provided with a lever member 11a at each end thereof to thereby allow the shaft 20 be linked to the linkage means 9a, 9b, 9c, 9d in the same way as the longitudinal shaft 12a of FIGS. 1b and 1c. The longitudinal shaft 20 of FIG. 3 further includes a spline joint 21 which allows a degree of movement in the longitudinal direction of the shaft 20.

The longitudinal shaft 20 functionally links the front and back transverse torsion bars in such a way so that the torsion bars of the suspension system can react in unison in dependence on the vehicle dynamics. The functional linking by the longitudinal shaft of the front and back transverse torsion bars allow the suspension system to maintain and return the attitude of the vehicle to a position that is at least substantially parallel to the average surface plane supporting the vehicle.

In particular, the wheels are free to move when undergoing warp motions when one pair of diagonally opposed wheels are displaced in the same general direction and in an opposite direction relative to the other pair of diagonally opposite wheels. In situations when the vehicle is primarily undergoing roll when the wheels on one side of the vehicle are both moving in the same general direction relative to the wheels on the other side of the vehicle, the torsion bars can act in the same manner as a conventional stabiliser to provide roll stiffness for the vehicle.

However, under warp situations which results in counter rotation of adjacent transverse torsion bars also results in rotation of the longitudinal shaft. This results in a transfer of force between the wheels to thereby facilitate the movement of the wheels. It should be noted that there is a progressive change in the degree of relative rotation between the torsion bars as the vehicle is subjected to varying combinations of roll and warp situations. The torsion bars will therefore only be allowed to counter rotate relative to each other when the vehicle is in roll, if the surface engaging means are also undergoing warp motions, thereby permanently maintaining control of the roll attitude of the vehicle.

Figure 4:
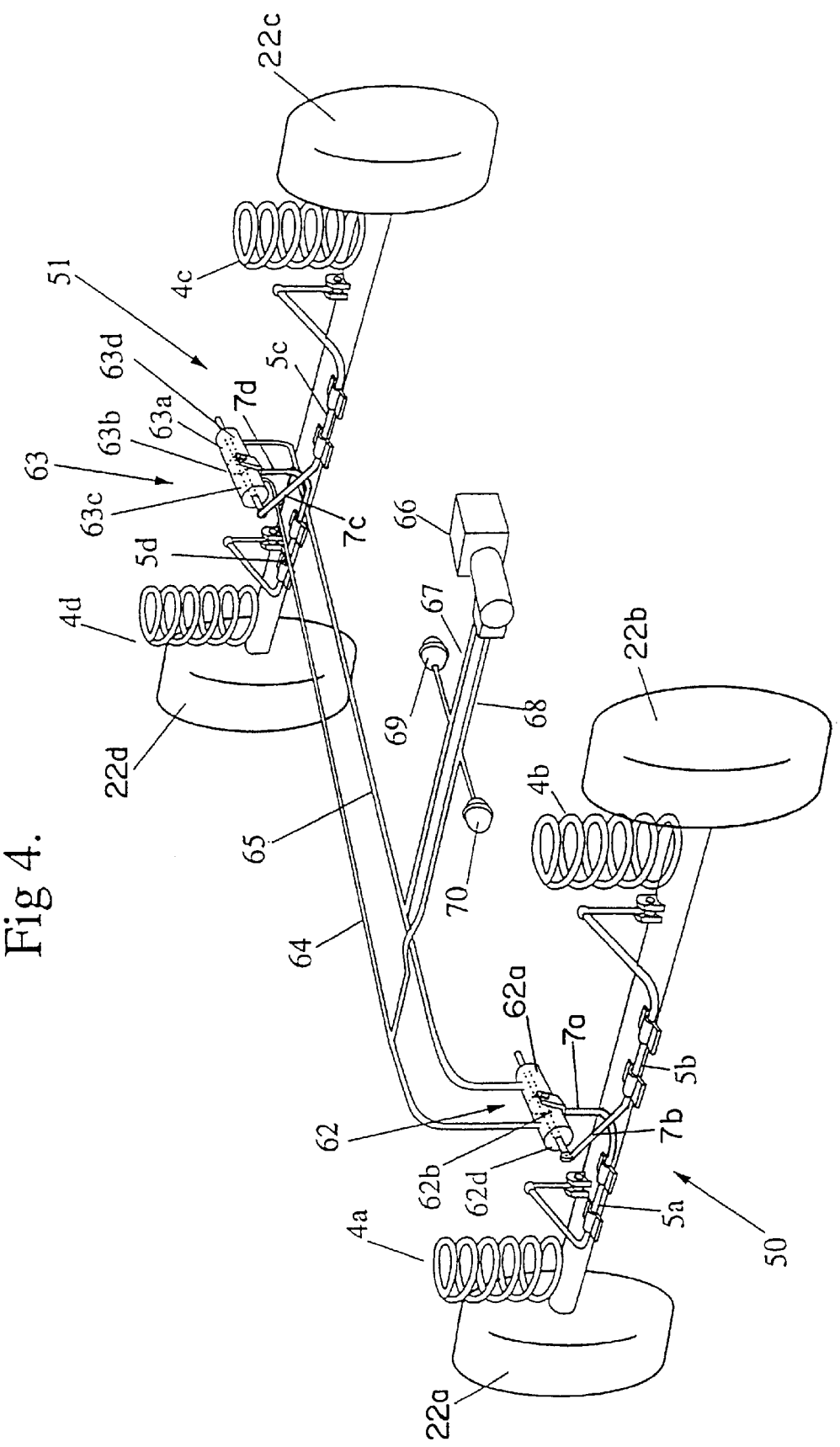
FIG. 4 is a schematic isometric view of a general layout showing a fifth embodiment of a suspension system according to the present invention.

FIG. 4 shows another embodiment of the suspension system. The vehicle suspension system is shown with the front of the vehicle being directed towards the bottom left corner of the drawing sheet. The vehicle is supported on wheels 22a, 22b, 22c, 22d Coil springs 4a, 4b, 4c, 4d support the vehicle chassis (not shown) and provide for resilience in the ride of the vehicle.

Torsion means 50, 51 are provided at the front and rear of the vehicle. These torsion means at the front and rear axles of the vehicle are linked either mechanically or hydraulically. Since the hydraulic linkage system is easier to package and describe in a more generic form the ensuing description will refer to the hydraulic linkage system although other linkage systems may optionally be used to provide a method for the suspension system to distinguish between roll and warp motions of the surface engaging means in a similar manner. Further the suspension system is "passive" and not "active". In other words, no external sensors are required to operate the system which reacts automatically to vehicle motion. It should be noted that the system shown in FIG. 3 is also a "passive" system. Each arrangement includes a pair of transverse torsion bars 5a, 5b, 5c, 5d as in the arrangement shown in the previously described embodiment. In FIG. 4 however, the torsion bars are interconnected by means of a hydraulic double-acting ram assembly 62, 63. Each ram assembly has a cylinder 62a, 63a and a piston 62b, 63b supported therein to separate the cylinder into an inner chamber 62c, 63c and an outer chamber 62d, 63d. The lever arm 7a, 7d at one end of one of the torsion bar pairs 5a, 5d coupled with and movable together with the cylinder 62a, 63a. The lever arm 7b, 7c of the other of the torsion bar pairs 5b, 5c is coupled with and movable together with the piston 62b, 63b. Conduits 64, 65 provide fluid communication between the two ram assemblies 62, 63. In the illustrated embodiment, each conduit 64, 65 connects the inner chamber 62c, 63c of one ram assembly with the outer chamber 62d, 63d of the other ram assembly. It is however to be appreciated that other conduit connection arrangements between the two ram assemblies are also possible depending on the design of the transverse torsion bars which may reverse the sense of rotation if, for example, one pair is located behind the axle while the other pair of transverse torsion bars is located in front of the other axle. Therefore, the outer chambers can be connected by one conduit whereas the inner chambers can be connected by another conduit.

A fluid pump and reservoir assembly 66 may optionally be provided to supply and remove fluid from the ram assemblies and associated conduits. This arrangement allows for additional control of the roll resilience and also provides some active roll control for the vehicle, and active assistance with warp motions to overcome the resistance of the springs (when used). In addition, the roll attitude of the vehicle can be controlled by varying the volume of fluid within the hydraulic circuit. To this end, the pump/reservoir assembly 66 is connected to the conduits 64, 65 connecting the two ram assemblies 62, 63 by two secondary conduits 67, 68, each respectively connected to one of the conduits 64, 65. Accumulators 69, 70 may also be provided on the secondary conduits to provide additional resilience in the suspension system. It should be noted that most of the resilience within the vehicle ride in terms of pitch and whole body motion is provided by the springs 4a, 4b, 4c, 4d and that roll resilience is only provided by the resilience in the optional accumulators 69, 70 or such resilience as there may be permitted in the transverse torsion bars 5a, 5b, 5c and 5d and linkages and bushes attached thereto.

Figure 5:
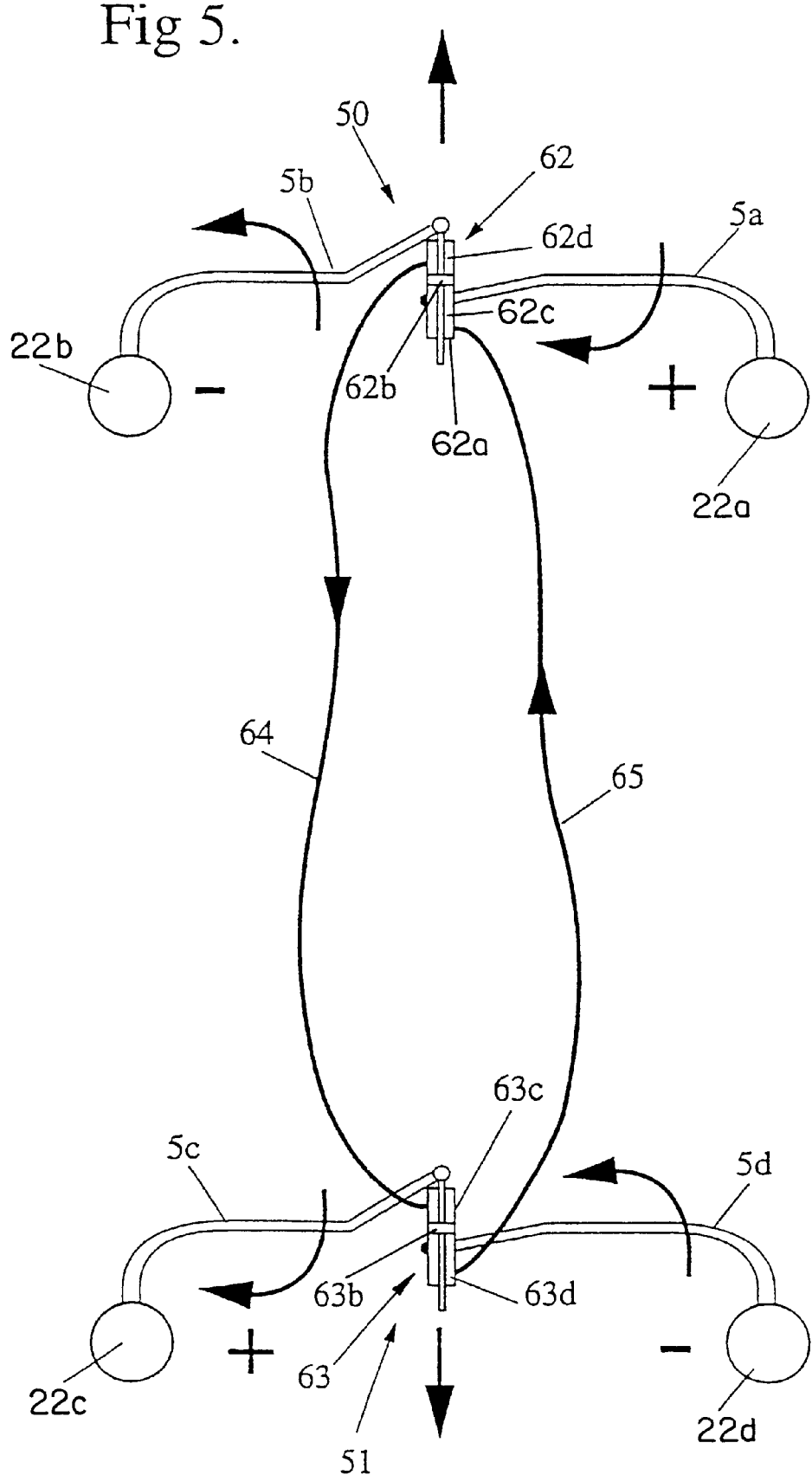
FIGS. 5 and 6 are schematic diagrams respectively showing the fluid flow direction under warp and roll motions within the suspension system of FIG. 4.
Figure 6:
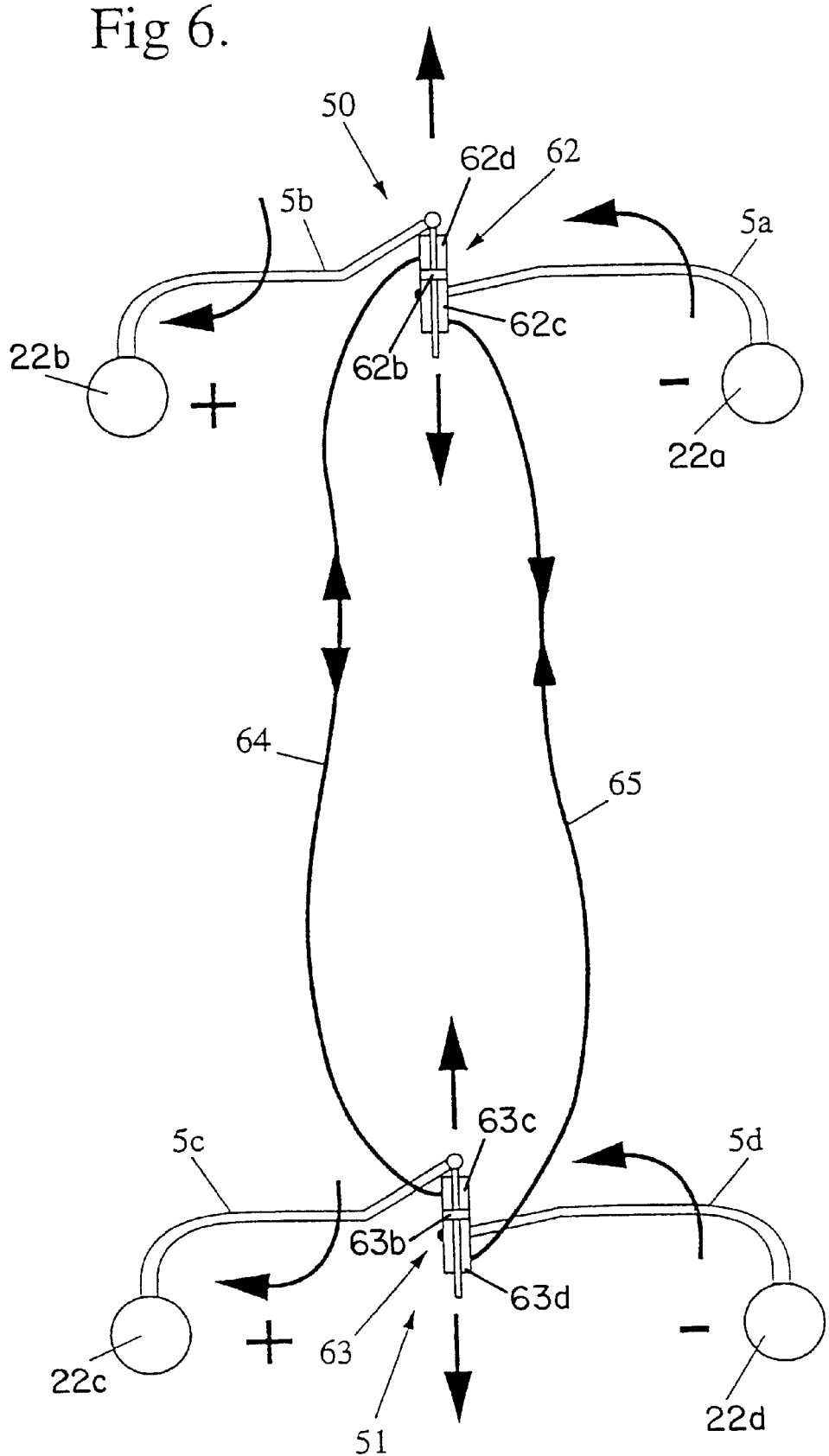

FIGS. 5 and 6 show the fluid flow within the system and between the ram assemblies when there is warp motion of the wheels (FIG. 5) and when there is roll motion of the wheels (FIG. 6). The schematic diagrams show the suspension system in plan view with the front of the vehicle being directed to the top of the sheet. Thus as each wheel 22a, 22b, 22c, 23b moves in a generally vertical direction, this would be a movement in the direction normal to the plane of the drawing sheet. Accordingly, upward wheel motion is therefore indicated by the symbol "−" whereas downward wheel motion is indicated by the symbol "+".

Referring initially to FIG. 5, when there is warp motion of the wheels, the diagonally adjacent wheels move together in the same direction which is opposite to the direction of movement of the other diagonally adjacent wheels of the vehicle. In this situation, because of the direction of movement of the wheels, and the way that the torsion bars are respectively connected to the cylinder and piston of the cylinder assembly, counter rotation of the torsion bars are possible.

For example, in the case of the front force transmitting arrangement 50, when the front left wheel 22b moves upwards and the front right wheel 22a moves downwards, the counter rotation of the front transverse torsion bars 5a, 5b results in a decrease in volume of the outer chamber 62d of the front hydraulic ram assembly 62, and an increase in the volume of the inner chamber 62c thereof because of the relative motion of the piston 62b within the cylinder 62a. Fluid therefore flows from outer chamber 62d through conduit 64 to the inner chamber 63c of the rear hydraulic ram assembly 63 while fluid flows to the inner chamber 62c of the front hydraulic cylinder 62 through conduit 65 from the outer chamber 63d of the rear hydraulic ram assembly 63. This fluid flow is aided by the relative motion of the rear transverse torsion bars 5c, 5d. This fluid movement ensures that warp motions can be readily achieved by the suspension system.

By comparison, in FIG. 6, the wheels on each side of the vehicle move in the same direction and opposite to the direction of movement of the wheels on the other side of the vehicle. The direction of movement of the wheels show that the vehicle is turning left resulting in roll motion of the vehicle. Because of the respective attempted rotation of each transverse torsion bar, and the interconnection between the chambers of each ram assembly, the fluid flow from each chamber is counter acted by the fluid flow from the opposing chamber such that there is little to no relative motion between the piston and cylinder of each ram assembly. Each pair of transverse torsion bars therefore acts in unison in a similar manner as a conventional roll stabiliser bar in roll but unlike conventional roll bars the system described simultaneously provides roll control stiffness and permits wheel motions resulting from warp. The functional relationship of the linking between the two rams can also be viewed as a function of the pressure differential across the piston within each ram. When the vehicle is undergoing roll as shown in FIG. 6, the pressure differential across the piston of each ram is relatively high, with the load and therefore the pressure carried by fluid chambers 63d and 62c being higher than for chambers 63b and 62d. However, under warp motions as shown in FIG. 5, the pressure differential across the pistons will be relatively low. The pressure differential therefore progressively decreases as the vehicle moves from primarily roll situations to warp situations.

It should be noted that in conventional roll stabiliser bar systems the torsion bars are "wound up" during cornering and if the road also happens to be undulating on a corner requiring a degree of warp this then requires that one end of the torsion bars is additionally wound up while the other end is partially relaxed and these alternating axle movements can cause rapid shifts of the weight borne by the wheels which in turn cause the lack of traction at the tyre contact patches. In the embodiments shown in FIGS. 3 and 4 the ground pressure at the wheels is therefore maintained more consistently thereby reducing the risk of skidding on the corners of poorly surfaced roads.

Additionally, in conventional roll stabilisation systems such as transverse torsion bars, when a single wheel impacts a bump or encounters a hollow, the torsion bar is rapidly wound up causing the impact to be resolved by the transversely adjacent wheel and spring assembly as well as by the support points on the chassis, and this results in single wheel input harshness being experienced by the vehicle occupants. It should be understood that a single wheel input is, in part a warp motion in that it requires two diagonally opposite wheels to move in one direction while the other diagonally opposite pair move in the other direction. Since conventional roll stabiliser bars of the front and back axles are independent they are intrinsically unable to differentiate and react differently to single wheel inputs and roll motions and all such inputs are therefore reacted to in similar manner causing harshness of ride quality and inferior road holding due to inappropriate weight shifting between wheels. In contrast the structural and functional relationship of the components in the system (shown in the accompanying Figures) requires that both axles interact such that roll and warp are differentiated and reacted upon in different ways so that as minor warp motions occur as when a single wheel input occurs this is not interpreted as a roll motion (on one axle) requiring maximum stiffness of the roll stabiliser bar leading to undue harshness. In the invented system, therefore, a single wheel input may be reacted to as a minor high speed warp motion which need not be resisted and which therefore does not need to resolved solely by the transversely adjacent wheel assembly causing unnecessary harshness.

Figure 7:
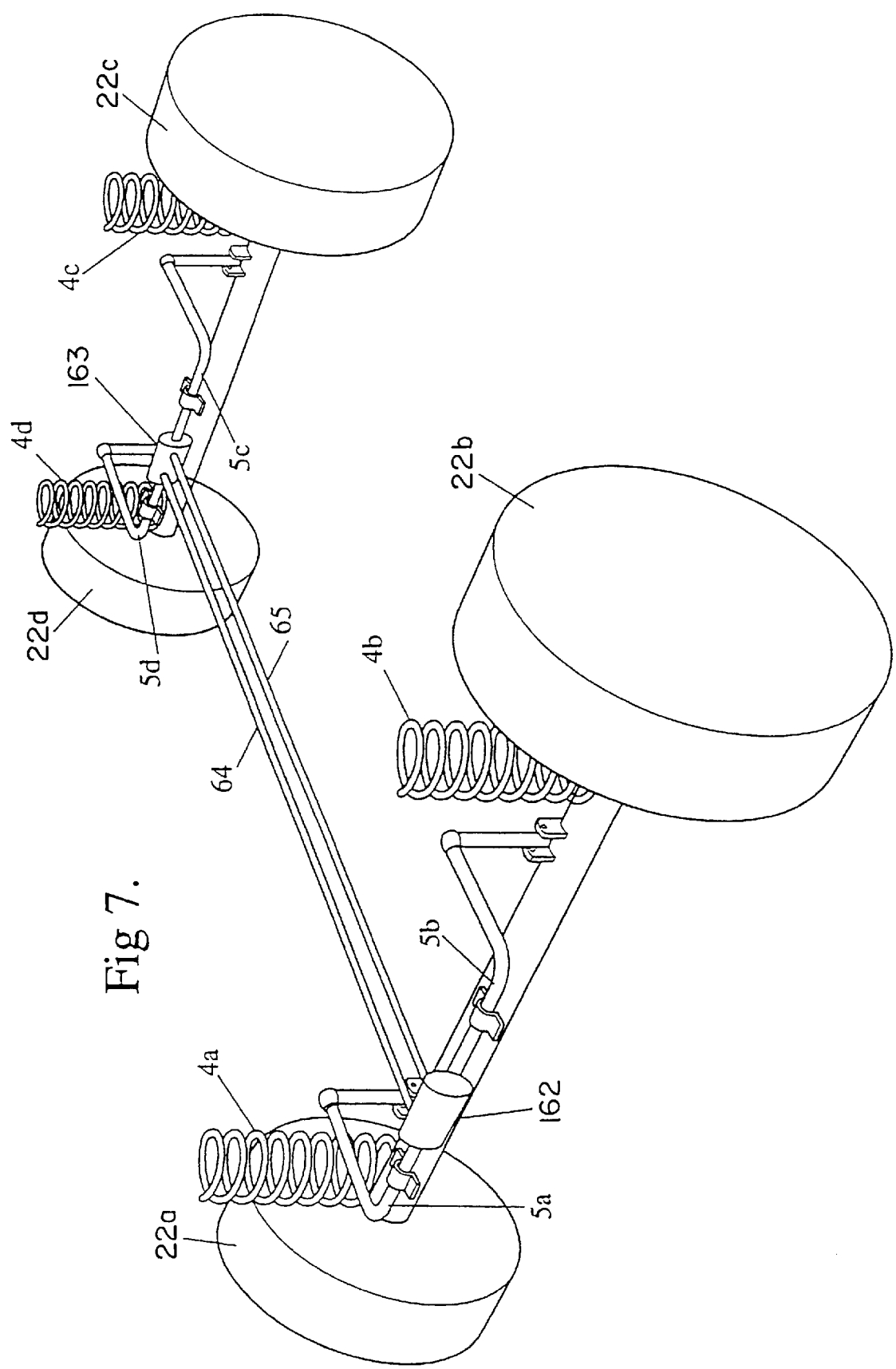
FIG. 7 is a schematic isometric view of a general layout showing a sixth embodiment of a suspension system according to the present invention.

The embodiment shown in FIG. 7 is similar to the embodiment of FIG. 4 except that the hydraulic double-acting rams are replaced by rotary actuators or rams 162, 163. These rotary rams include a housing supporting a rotor rotatably supported therein which separates the housing into two fluid chambers. The housing and the rotor are respectively connected to one of the adjacent transverse torsion bars. Conduits 64, 65 interconnect the corresponding fluid chambers of each of the rotary rams 162, 163. This embodiment operates in the same way as the embodiment of FIG. 4. In particular, the wheels are permitted to move when undergoing warp motions while roll motion of the vehicle is reacted to by the torsion bars. The primary advantage is that the use of rotary rams eliminates the need for lever arms on transverse torsion bars thereby reducing the amount of clearance required to accommodate the suspension system as well as leading to a neater overall arrangement.

Figure 8:
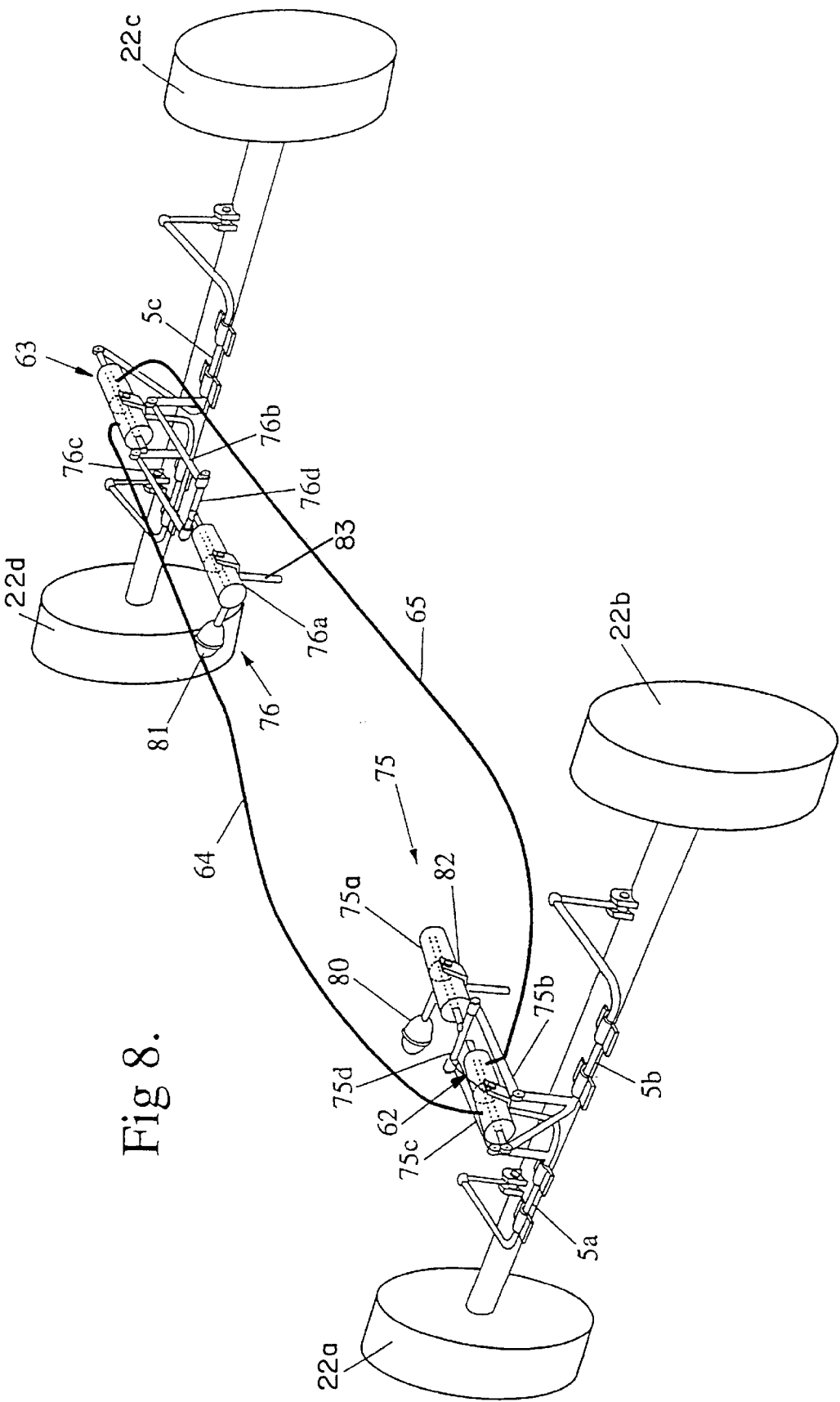
FIG. 8 is a schematic isometric view of a general layout showing a seventh embodiment of a suspension system according to the present invention.
Figure 9:
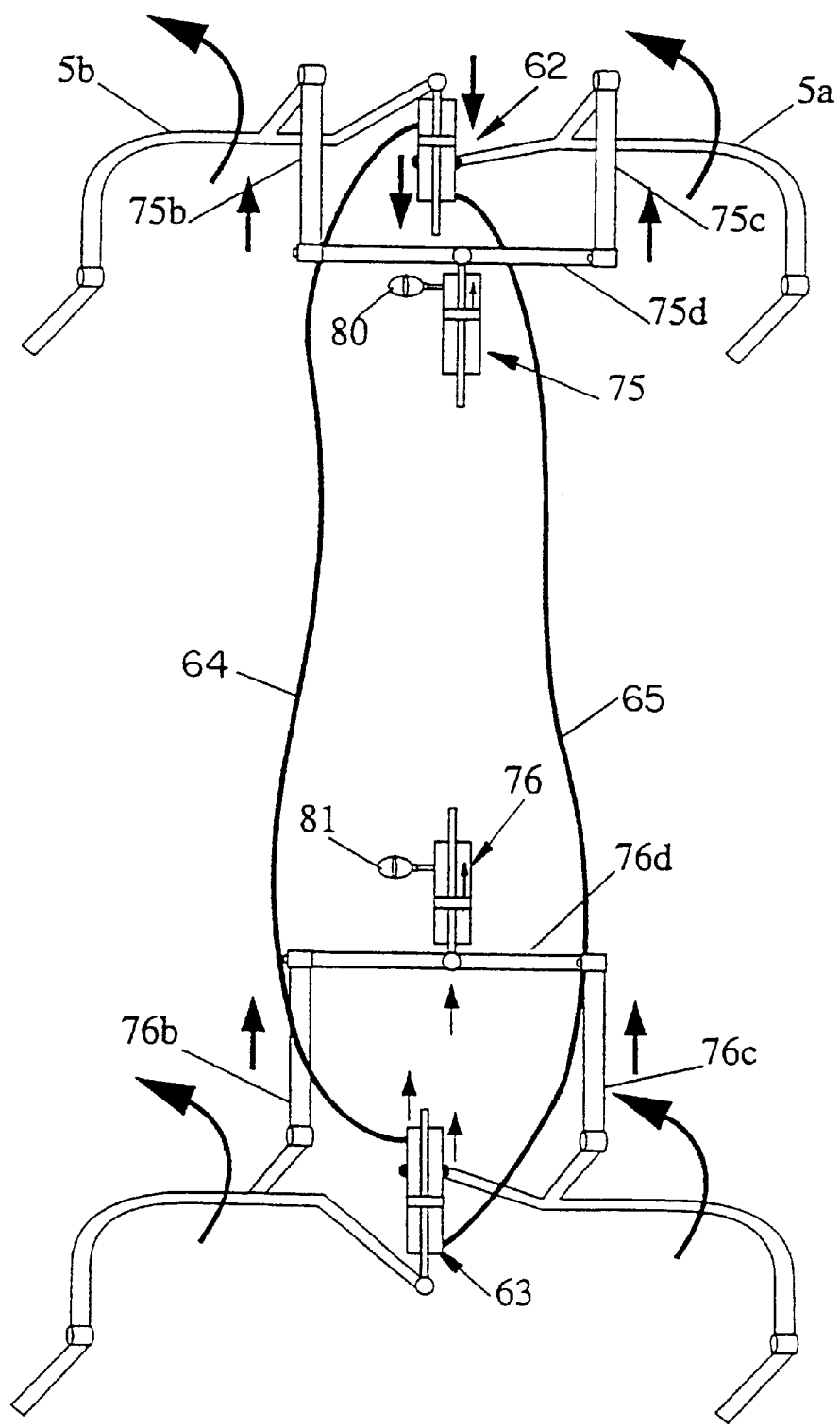
FIG. 9 is a schematic diagram showing the fluid flow direction under a warp motion within the suspension system of FIG. 8.

FIGS. 8 and 9 illustrate a further embodiment of the vehicle suspension system wherein the vehicle is also supported by the suspension system according to the present invention. This embodiment is also similar to the embodiment shown in FIG. 4 except that the coil springs are eliminated and replaced with a support arrangement 75, 76 interconnecting each pair of transverse torsion bars. This leads to the abovenoted advantage in that it is possible to provide at least substantially equal loading on each wheel. Each support arrangement may include linkage means 75b, 75c, 76b, 76c connecting each transverse torsion bar pair to a respective cross member 75d, 76d. The cross member 75d, 76d may be directly connected to the lever arms such as 7a, 7b to obviate the requirement of links 75c and 75b when the support arrangements are located so as not to conflict with components 62 and 63. The cross members are each coupled to a resilient support means 75a, 76a. In this arrangement, the force to support the vehicle is resolved through the transverse torsion bars to the load support ram assemblies 75a, 76a which are secured by locating means 82, 83 to the vehicle chassis and which permit some relative movement to accommodate to positional changes. The provision of the cross member arrangement "averages" the load carried by the associated load assemblies, this average load being resolved through the resilient support means to the vehicle chassis. The resilience of the suspension system is provided by means of accumulators 80, 81 in fluid communication with each load support ram assembly. While FIG. 8 illustrates vehicle support means incorporating hydraulic rams and accumulators it should be understood that these resilient devices may be replaced by conventional steel or rubber or composite resilient mechanisms such as springs. It is noted that the conduit connections in this embodiment are similar to the connections shown in FIG. 4. In particular, the inner chambers of each cylinder assembly 62, 63 are connected by one conduit to the outer chambers of the other cylinders.

According to the design of the torsion bars, the resilient support means may be designed/engineered to support the vehicle by being in tension or compression. By way of example, the front resilient support means 75 and linkages 75b, 75c as seen in FIGS. 8 and 9 would normally be in tension when supporting the vehicle's static weight while the rear resilient support means 76 and linkages 76b, 76c would be in compression under the same conditions.

Figure 10:
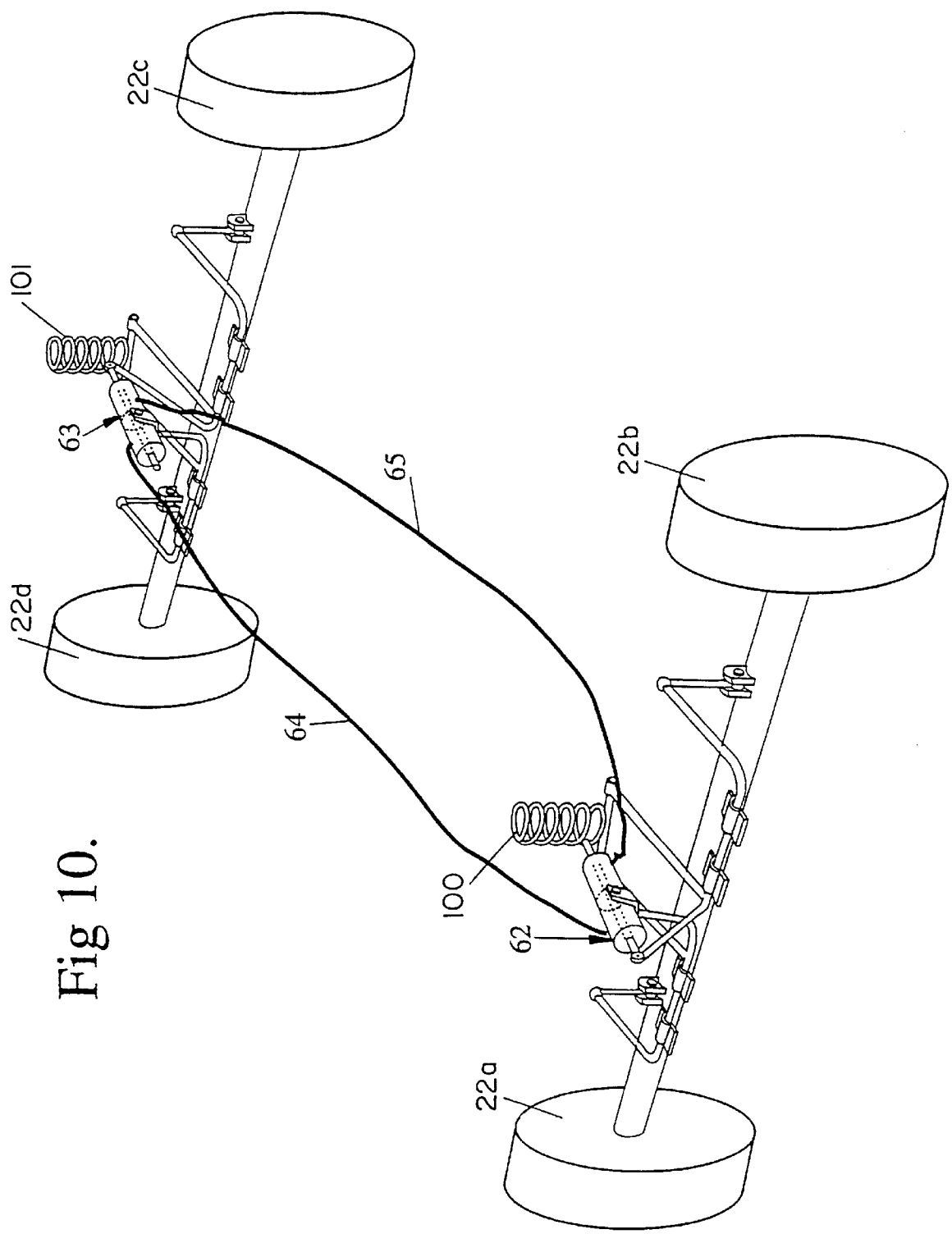
FIG. 10 is a schematic isometric view of a general layout showing an eighth embodiment of a suspension system according to the present invention.

The embodiment shown in FIG. 10 operates in a similar manner to the embodiment of FIG. 8. The primary difference is that the load support ram assemblies 75a, 76a are replaced by coil springs 100, 101.

Figure 11:
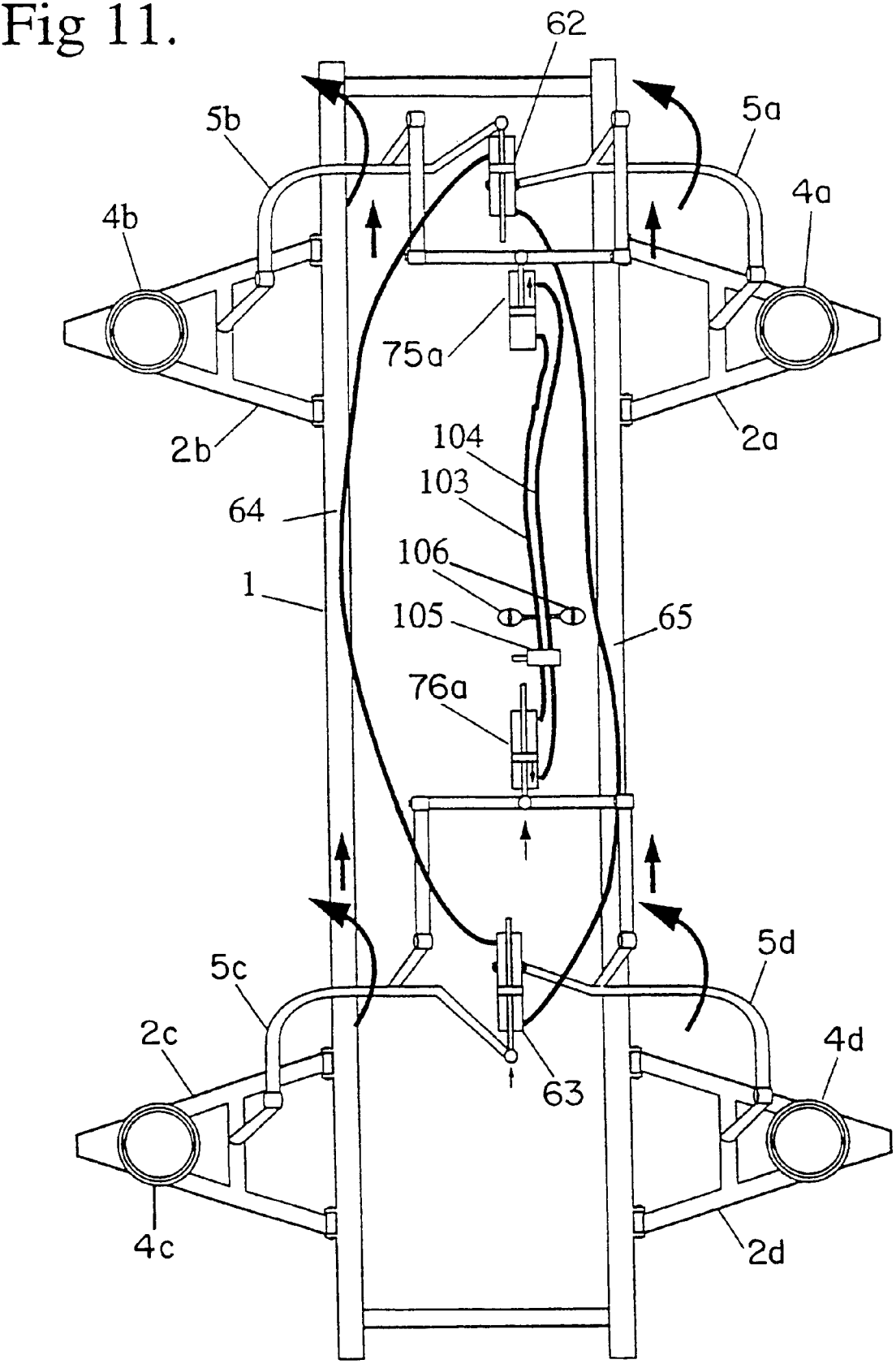
FIG. 11 is a plan view of a ninth embodiment of a suspension system according to the present invention.

FIG. 11 shows yet another embodiment which is a further development of the embodiment of FIG. 8. The weight of the vehicle is primarily supported by the coil springs 4a, 4b, 4c, 4d located at each wishbone 2a, 2b, 2c, 2d. The load support rams 75a, 76a are retained. Further conduits 103, 104 are however provided to connect corresponding fluid chambers of those rams. A valve 105 controls the flowpath of fluid between the fluid chambers when the valve is in one position, the corresponding inner fluid chambers and the respective outer fluid chambers are in fluid communication. When the valve is in a second position, the connection is reversed such that each inner chamber is now in fluid communication with an outer fluid chamber. This arrangement allows control of the pitch of the vehicle by providing means to raise and lower each end of the vehicle.

Accumulators 106 may also be provided on each conduit. This provides an amount of damping to control the degree of pitch of the vehicle.

Figure 12:
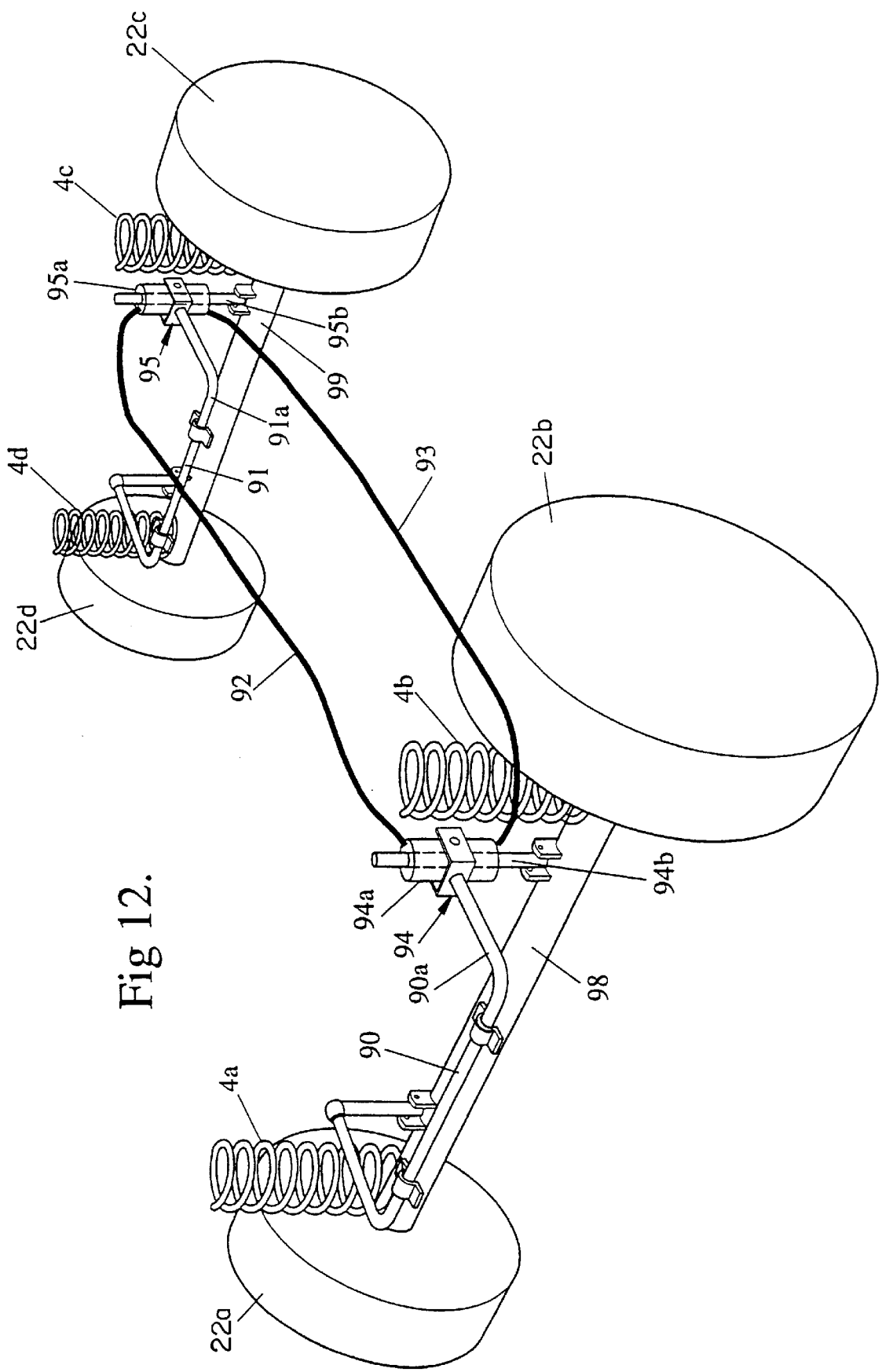
FIG. 12 is an isometric view of a tenth embodiment of a suspension system according to the present invention.

FIG. 12 shows a further embodiment of the present invention which operates in a similar fashion to the embodiment of FIG. 4. The main difference is that the transverse torsion bar pairs are substituted by a single front and rear torsion bar 90, 91. One end of each bar is connected to the wheel locating means 98, 99 shown as a simple axle in the drawing by way of a drop link as commonly used to couple roll stabiliser bars to axle or wheel assemblies. The other end of the torsion bar is connected to the axle by way of an hydraulic double-acting ram assembly 94, 95 which takes the place of the normal drop link component which links the roll stabiliser bar to the axle whilst accommodating changes in angle between the components. In this particular embodiment, the roll stabiliser bar is coupled to the hydraulic cylinder chamber housing 94a, 95a while the piston rod 94b, 95b of each ram assembly is connected to the wheel locating means 98, 99.

In the embodiment shown in FIG. 12, it will be seen that the piston rods pass right through the rams so that the upper and lower piston faces have identical surface areas. In some situations it may be preferable to use a single piston rod extending out of one end of the ram end only or to use rod diameters of different outside diameters to overcome asymmetries and/or provide specific roll split geometries.

In this embodiment, when there is roll motion of the vehicle, fluid flow is prevented through the conduits 92, 93 connecting the ram assemblies 94, 95 in the same way as previously described with reference to FIG. 4 and FIG. 6. Movement of the end 90a, 91a of the torsion bar 90, 91 secured to the ram assembly relative to the wheel support is therefore prevented and the torsion bar therefore operates in a similar manner as a conventional stabiliser bar. During warp motions of the wheels, fluid movement through the conduits 92, 93 connecting the ram assemblies 94, 95 allow movement of the ram assembly end 90a, 91a of the torsion bars relative to the wheel locating means 98, 99 thereby facilitating the warp motion. The vehicle suspension system however otherwise operates in a similar way as the embodiment shown in FIGS. 4 and 8.

It should be noted that each of the double-acting rams could be provided by two single-acting rams respectively connecting the opposing ends of the roll stabiliser bar. By connecting the fluid chamber of each single-acting ram with the corresponding ram of the opposite stabiliser bar, this arrangement can operate in the same general manner as the embodiment of FIG. 12.

Although all of the above noted embodiments use torsion bar arrangements, it is also to be understood that the present invention can also encompass arrangements where transverse push/pull rods replace the torsion rods, with the adjustment means linking the rods applying tension or compression forces on each rod.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A suspension system for a vehicle, said vehicle having a body and at least one forward pair of transversely adjacent surface engaging means and at least one rearward pair of transversely adjacent surface engaging means connected to the body to allow substantially vertical relative motion of each surface engaging means with respect to the body, the suspension system including resilient support means for providing resilient support for substantially the total mass of the vehicle body with respect to the surface engaging means, at least one forward and at least one rearward force transmitting means, each force transmitting means interconnecting at least one of said pairs of transversely adjacent surface engaging means, each force transmitting means including adjustment means, the adjustment means being longitudinally spaced and functionally linked such that the magnitude and the direction of the force transmitted between associated transversely adjacent surface engaging means by each of the force transmitting means varies progressively as a function of the relative positions of, and the load applied to, at least two pairs of the interconnected transversely adjacent surface engaging means, to thereby restrict roll motions of the vehicle whilst simultaneously facilitating warp motions of the surface engaging means.

2. A vehicular suspension system according to claim 1, wherein said resilient support means are provided between each said surface engaging means and the body of the vehicle.

3. A vehicular suspension system according to claim 1, wherein said resilient support means is provided for at least one of said pairs of transversely adjacent surface engaging means for carrying the load applied to both of the associated transversely adjacent surface engaging means.

4. A vehicular suspension system according to claim 1, wherein said resilient support means is provided for said at least one forward pair of transversely adjacent surface engaging means and said resilient support means is provided for said at least one rearward pair of transversely adjacent surface engaging means for respectively providing substantially equal loading on each of the transversely associated surface engaging means.

5. A vehicular suspension system according to claim 1 wherein the force transmitted by the force transmitting means is a torsional force.

6. A vehicular suspension system according to claim 1 wherein said force transmitting means includes at least one transverse torsion bar.

7. A vehicular suspension system according to claim 6, wherein at least one of said force transmitting means includes a first pair of transverse torsion bars, each torsion bar being respectively connected to one of said surface engaging means, the pair of transverse torsion bars being interconnected by the adjustment means.

8. A vehicular suspension system according to claim 7, wherein each torsion bar in the pair of transverse torsion bars has an elongate axis extending in a substantially transverse direction across the vehicle, the torsion bars being rotatable about their elongate axes, the adjustment means progressively controlling the axial rotation of the associated torsion bars relative to each other such that the surface engaging means are permitted to move when undergoing warp motions while the roll attitude of the vehicle is simultaneously restrained by the torsion bars.

9. A vehicular suspension system according to claim 8 wherein each adjustment means provides a mechanical interconnection of an associated pair of torsion bars, and wherein the adjustment means interconnecting said pair of transversely adjacent forward surface engaging means and the adjustment means interconnecting said pair of transversely adjacent rearward surface engaging means are functionally linked by a mechanical connection.

10. A vehicular suspension system according to claim 9 wherein the mechanical connection is a longitudinal shaft interconnecting said adjustment means, each adjustment means including a pair of linkage members respectively connected at one end thereof to one of the torsion bars, the other end of each pair of linkage members being connected to an end of the longitudinal shaft such that torsional forces can be transmitted between said adjustment means.

11. A vehicle suspension system according to claim 7, wherein the adjustment means provides a hydraulically adjustable connection of the torsion bars.

12. A vehicular suspension system according to claim 11, wherein at least one of the adjustment means includes a double-acting ram, the ram having a cylinder and a piston assembly separating the cylinder into two fluid chambers therein, the cylinder being connected to one of the torsion bars, the piston assembly being connected to the other torsion bar, and wherein a fluid communication is provided between said ram and a longitudinally spaced adjustment means.

13. A vehicular suspension system according to claim 12, further comprising a second pair of transverse torsion bars, wherein the fluid communication is provided by a pair of conduit means connecting the two fluid chambers of a double-acting ram within the adjustment means between the first pair of transverse torsion bars, with the fluid chambers of a double-acting ram within the adjustment means between the second pair of transverse torsion bars, whereby the transfer of fluid between the fluid chambers enables relative displacement between each piston assembly and the respectively associated cylinder.

14. A vehicular suspension system according to claim 13, wherein the fluid chambers are connected such that the surface engaging means are permitted to move when undergoing warp motions with the movement of the respective piston assembly within each respective cylinder allowing the transfer of fluid between the connected fluid chambers causing minimal change in the pressure differential across the piston assembly, while roll motions of the vehicle are reacted by an increase in the pressure differential across the piston assemblies generated by the increase in load on the surface engaging means on one side of the vehicle and the similar reduction in the load on the surface engaging means on the other side of the vehicle to thereby control the roll attitude of the vehicle whilst simultaneously minimising the changes in load on each surface engaging means due to warp motions.

15. A vehicular suspension system according to claim 14, further including fluid supply means for supplying fluid to the pair of conduit means so that fluid can be added to a first conduit of said pair of conduit means and fluid can be at least substantially simultaneously removed from a second conduit of said pair of conduit means to thereby enable the roll angle of the vehicle to be controlled either relatively quickly for an active roll control, or relatively slowly for a simple average levelling function.

16. A vehicular suspension system according to claim 15, further including roll resilience means in fluid communication with both of the conduit means.

17. A vehicular suspension system according to claim 16 wherein the roll resilience is controllable by changing the pressure and volume of fluid in the conduit means and the roll resilience means using the fluid supply means.

18. A vehicular suspension system according to claim 13, further including yoke means interconnecting each pair of torsion bars, double-acting support rams interconnecting the yoke means with the body of the vehicle, second conduit means connecting corresponding chambers of the double-acting support rams, and valve means for controlling the fluid flow through each second conduit means to thereby control the pitch motion of the vehicle.

19. A vehicular suspension system according to claim 18, wherein the second conduit means comprises a pair of conduits and further including at least one accumulator in fluid communication with at least one of the conduits in said second conduit means.

20. A vehicular suspension system according to claim 18, further including fluid supply means for supplying and removing fluid from said pair of conduit means.

21. A vehicular suspension system according to claim 7 wherein the adjustment means is a rotary actuation means including a housing supporting a rotor separating the housing into at least two fluid chambers, the housing being connected to one of the torsion bars, the rotor being connected to the other torsion bar.

22. A vehicular suspension system according to claim 21 including conduit means providing fluid communication between the two fluid chambers of the rotary actuation means of the forward torsion bars and the fluid chambers of the rotary actuation means of the rearward torsion bars.

23. A vehicular suspension system according to claim 22 wherein the fluid chambers are connected to thereby progressively vary the relative rotation of the rotor within the housing in each of the linked rotary actuation means such that the surface engaging means are permitted to move when undergoing warp motions with the movement of the rotor within each housing allowing the transfer of fluid between the connected fluid chambers with minimal change in the pressure differential across the rotor, while roll motions of the vehicle are reacted by an increase in the pressure differential across the rotors generated by the increase in load on the surface engaging means on one side of the vehicle and the similar reduction in the load on the surface engaging means on the other side of the vehicle to thereby control the roll attitude of the vehicle whilst simultaneously minimising the changes in load on each surface engaging means due to warp motions.

24. A vehicular suspension system according to claim 7, including a yoke means interconnecting said pair of torsion bars, wherein said resilient support means connects the yoke means to the body of the vehicle, the yoke means transferring the average load carried by the associated surface engaging means to the resilient support means such that the resilient support means at least substantially supports at least a portion of the vehicle to thereby permit the vehicle to maintain an at least substantially uniform load in each surface engaging means regardless of the warp position of the surface engaging means.

25. A vehicular suspension system according to claim 24 wherein the yoke means is provided by a lever arm respectively extending from each torsion bar, the lever arms being interconnected by a cross member arrangement.

26. A vehicular suspension system according to claim 25 wherein the resilient support means interconnects the cross member arrangement with the chassis of the vehicle, the resilient support means including a load support ram having an accumulator in fluid communication with the ram to provide said resilient support.

27. A vehicular suspension system according to claim 6 wherein the force transmitting means includes a single transverse torsion bar and the adjustment means interconnects the torsion bar to at least one of the associated surface engaging means.

28. A-vehicular suspension system according to claim 27 wherein the adjustment means provides a hydraulic connection of the torsion bar to the associated surface engaging means.

29. A vehicular suspension system according to claim 28 wherein each said adjustment means includes a double-acting ram located at one end of the torsion bar, the ram having a cylinder and a piston assembly separating the cylinder into two fluid chambers therein, the cylinder and the piston assembly being connected between one end of the torsion bar and the adjacent surface engaging means.

30. A vehicular suspension system according to claim 29 wherein the rams are in fluid communication and wherein said fluid communication is provided by conduit means respectively connecting the two fluid chambers of the double-acting ram of the forward torsion bar with the fluid chambers of the double-acting ram of the rearward torsion bar.

31. A vehicular suspension system according to claim 30 wherein the fluid chambers are connected such that the surface engaging means are permitted to move when undergoing warp motions with the movement of the piston assembly within each cylinder allowing the transfer of fluid between the connected fluid chambers causing minimal change in the pressure differential across the piston assembly, while roll motions of the vehicle are reacted by an increase in the pressure differential across the piston assemblies generated by the increase in load on the surface engaging means on one side of the vehicle and the similar reduction in the load on the surface engaging means on the other side of the vehicle to thereby control the roll attitude of the vehicle whilst substantially minimising the changes in load on each surface engaging means due to warp motions.

32. A vehicular suspension system according to claim 31 further including fluid supply means for supplying fluid to the conduit means so that fluid can be added to a first conduit and fluid can be at least substantially simultaneously removed from a second conduit to thereby enable the roll angle of the vehicle to be controlled either relatively quickly for an active roll control, or relatively slowly for a simple average levelling function.

33. A vehicular suspension system according to claim 32 further including roll resilience means in fluid communication with both of the conduit means.

34. A vehicular suspension system according to claim 32 wherein the roll resilience is controllable by changing the pressure and volume of fluid in the conduit means and the roll resilience means using the fluid supply means.

35. A vehicular suspension system according to claim 28 wherein the adjustment means is a single-acting ram located at each end of the torsion bars, each ram having a cylinder and a piston assembly supported therein to provide a fluid chamber within the cylinder, the cylinder and piston assembly being connected to one of the torsion bars and the adjacent surface engaging means.

36. A vehicular suspension system according to claim 35 wherein a fluid communication is provided between the rams wherein said fluid communication is provided by conduit means respectively connecting the fluid chamber of each single-acting ram of the forward torsion bar with the fluid chamber of the longitudinally opposing single-acting ram of the rearward torsion bar, the fluid chambers being connected such that the surface engaging means are permitted to move when undergoing warp motions, while roll motions of the vehicle are reacted to by the torsion bars whilst simultaneously minimising the changes in load on each said surface engaging means due to warp motions.

37. A vehicular suspension system according to claim 27 wherein the torsion bar is mechanically coupled to the associated surface engaging means.

38. A vehicular suspension system according to claim 27 wherein said resilient support means are provided between the surface engaging means and the chassis of the vehicle.

39. A vehicle including a suspension system according to claim 1.

40. A suspension system for a vehicle, said vehicle having a body and at least one forward pair of transversely adjacent surface engaging means and at least one rearward pair of transversely adjacent surface engaging means connected to the body to allow substantially vertical relative motion of each surface engaging means with respect to the body;

the suspension system including resilient support means, for supporting the vehicle body with respect to the surface engaging means, said resilient support means being provided for said at least one forward pair of transversely adjacent surface engaging means and for said at least one rearward pair of transversely adjacent surface engaging means for respectively providing substantially equal loading on each of the transversely associated surface engaging means;

at least one forward and at least one rearward force transmitting means, each force transmitting means interconnecting at least one of said pairs of transversely adjacent surface engaging means, each force transmitting means including adjustment means, the adjustment means being longitudinally spaced and functionally linked such that the magnitude and the direction of the force transmitted between associated transversely adjacent surface engaging means by each of the force transmitting means varies progressively as a function of the relative positions of, and the load applied to, at least two pairs of the interconnected transversely adjacent surface engaging means, to thereby restrict roll motions of the vehicle whilst simultaneously facilitating warp motions of the surface engaging means such that there is negligible change in the load on each said surface engaging means in relatively low speed warp motions.

* * * * *